(12) United States Patent
Vargantwar

(10) Patent No.: US 8,195,167 B1
(45) Date of Patent: Jun. 5, 2012

(54) DYNAMIC REVERSE ACTIVITY BIT OFFSET ADJUSTMENT BASED ON SOFT HANDOFF RATIO

(75) Inventor: Sachin R. Vargantwar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 108 days.

(21) Appl. No.: 12/834,045

(22) Filed: Jul. 12, 2010

(51) Int. Cl.
*H04W 36/00* (2009.01)

(52) U.S. Cl. .................. 455/442; 455/437; 370/331

(58) Field of Classification Search .......... 455/436–453; 370/229–240, 329–344
See application file for complete search history.

(56) References Cited

U.S. PATENT DOCUMENTS

| 6,477,155 B1* | 11/2002 | You ............................. 370/331 |
| 7,742,453 B1* | 6/2010 | Goyal et al. .................. 370/331 |
| 7,933,602 B1* | 4/2011 | Balakrishnan et al. ....... 455/437 |
| 2009/0323530 A1* | 12/2009 | Trigui et al. .................. 370/235 |

OTHER PUBLICATIONS

Zhiping Liu; Yafeng Wang; Dacheng Yang; , "Effect of soft handoff parameters and traffic loads on soft handoff ratio in CDMA systems," Communication Technology Proceedings, 2003. ICCT 2003. International Conference on , vol. 2, No., pp. 782-785 vol. 2, Apr. 9-11, 2003.*

Sung-Hwan Jung et al. "Quality of service estimation for soft handoff region ratio and call admission control in CDMA cellular systems" Computers & Industrial Engineering. vol. 56 Issue 4, May 2009. pp. 1429-1441.*

Unpublished U.S. Appl. No. 12/981,012, entitled "Dynamic Reverse Activity Bit Offset Adjustment Based On RF Conditions" filed Dec. 29, 2010 in the name of Sachin R Vargantwar.

* cited by examiner

*Primary Examiner* — Kent Chang
*Assistant Examiner* — Kashif Siddiqui

(57) ABSTRACT

A method and system is disclosed for dynamic reverse activity bit (RAB) offset adjustment based on soft handoff ratio. A base station controller (BSC) or radio node controller (RNC) or similar network device will determine the ratio of access terminals in soft handoff service to a total number of access terminals in service in each of a first and a second sector. Based at least on a comparison of a the ratio in the two sectors, the BSC (or RNC) will dynamically set a RAB offset in each sector in such a way that the response by served access terminals to RAB broadcasts from the two sectors will impact the smallest number of access terminals, while still achieving the intended purposes of RAB broadcasts.

24 Claims, 9 Drawing Sheets

| Ratio $R = \dfrac{N\_total_{Larger}}{N\_total_{Smaller}}$ | RAB Offset (time slots) |
|---|---|
| $1 < R \leq 2$ | 1 |
| $2 < R \leq 3$ | 2 |
| $3 < R \leq 4$ | 3 |
| $4 < R \leq 5$ | 4 |
| $5 < R \leq 6$ | 5 |
| $6 < R$ | 6 |

FIG. 7

DYNAMIC REVERSE ACTIVITY BIT OFFSET ADJUSTMENT BASED ON SOFT HANDOFF RATIO

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennae in the cells are in turn coupled to a base station controller (BSC) or a radio node controller (RNC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

When an access terminal (such as a cellular telephone, pager, or appropriately equipped portable computer, for instance) is positioned in a cell, the access terminal (also referred to herein by "AT") communicates via an RF air interface with the BTS antenna of the cell. Consequently, a communication path is established between the AT and the transport network, via the air interface, the BTS, the BSC and the switch or gateway. Functioning collectively to provide wireless (i.e., RF) access to services and transport in the wireless communication system, the BTS, BSC, MSC, and PDSN, comprise (possibly with additional components) what is typically referred as a Radio Access Network (RAN).

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, or by respective BTS antennas. These sectors can be referred to as "physical sectors," since they are physical areas of a cell site. Therefore, at any given instant, an access terminal in a wireless network will typically be positioned in a given physical sector and will be able to communicate with the transport network via the BTS serving that physical sector.

As an access terminal moves between wireless coverage areas of a wireless communication system, such as between cells or sectors, or when network conditions change or for other reasons, the AT may "hand off" from operating in one coverage area to operating in another coverage area. In a usual case, this handoff process is triggered by the access terminal monitoring the signal strength of various nearby available coverage areas, and the access terminal or the BSC (or other controlling network entity) determining when one or more threshold criteria are met. For instance, the AT may continuously monitor signal strength from various available sectors and notify the BSC when a given sector has a signal strength that is sufficiently higher than the sector in which the AT is currently operating. The BSC may then direct the AT to hand off to that other sector.

An access terminal may also engage in an active communication session simultaneously with multiple cells or sectors that are located geographically nearby one another, and which are all detected by the AT above one or another threshold signal strength. In this mode of operation, the AT is said to be in "soft handoff" with the multiple sectors, and may move among them seamlessly with respect to the active communication session. As the AT moves beyond the threshold range of one or another of its soft handoff sectors and into the range of one or more other sectors, usual handoff procedures are used to update the particular sectors with which the AT is in soft handoff.

In some wireless communication systems or markets, a wireless service provider may implement more than one type of air interface protocol. For example, a carrier may support one or another version of CDMA, such as EIA/TIA/IS-2000 Rel. 0, A (hereafter "IS-2000") for both circuit-cellular voice and data traffic, as well as a more exclusively packet-data-oriented protocol such as EIA/TIA/IS-856 Rel. 0 and Rev. A, or other version thereof (hereafter "IS-856" unless otherwise specified). Access terminals operating in such systems may be capable of communication with either or both protocols, and may further be capable of handing off between them, in addition to being able to hand off between various configurations of coverage areas.

Overview

An AT receives data from a base station on a "forward link" and sends data to the base station on a "reverse link." Data on either link are encoded by the sender and decoded by the receiver. The rate at which data can be transmitted on either link depends in part on the RF conditions of the respective link as well as the power level at which the data are transmitted. Better RF conditions and/or higher transmission power (e.g., higher signal-to-noise characteristics of a link) generally supports higher data rates, and vice versa. RF conditions may include factors such as noise and interference, while transmission power level is generally specified in accordance with one or more power-control procedures that are aimed at balancing the transmission power required to accommodate a given data rate with the impact of allocating the requisite power on one or another form of power budget and/or on RF interference.

In one of the power-control procedures, the base station monitors the aggregate reverse-link noise and interference resulting from the combined transmissions of active ATs in a sector or cell (or other form of coverage area), and periodically broadcasts a noise-indication message that reflects the aggregate reverse-link noise level measured by the base station. More specifically, the base station broadcasts a message to all ATs in its serving indicating whether or not the measured noise level exceeds a threshold noise level. In turn, each AT with an active call or session in the sector may then respond by adjusting its reverse-link power.

While the specific procedures followed by an individual AT in response to a received noise-indication message will not necessarily result in an immediate adjustment (down or up) in the AT's reverse-link power, the aggregate effect of the average response to a given noise-indication message of all ATs in a given sector will be in accordance with the desired effect of the message. Namely, if the message indicates that the threshold has been exceeded, the average response of each AT will be to reduce its reverse-link power, and the overall effect (i.e., of all active ATs in the sector) will be a reduction in aggregate reverse-link noise, possibly to a level below the threshold. Those ATs that reduce their reverse-link power will likely also have to reduce their reverse-link data transmission rate. Conversely, if the message indicates that the threshold has not been exceeded, the average response of each AT will be to increase its reverse-link power and correspondingly its reverse-link data transmission rate. In the case of increased power, the overall effect will be an increase in aggregate reverse-link noise, possibly to a level that exceeds the threshold.

It may happen that a portion of the aggregate reverse-link noise present in one sector contributes to the aggregate reverse-link noise in a second, geographically adjacent or nearby sector. This can occur, for example, when there is a group of access terminals that are all in soft handoff with both sectors at the same time. If both sectors broadcast their respective noise-indication messages at the same time, then the group of common soft handoff ATs will respond to both sectors at the same time. In this case, a noise-indication message signaling a need to reduce aggregate reverse-link power in one sector will trump a message signaling permission to increase aggregate reverse-link power in the other sector, and both sectors will tend to see a decrease in aggregate reverse-link power. Depending on the size of the group of common soft handoff ATs, as well as the particular noise-indication messages from each sector and the net decrease or increase in reverse-link noise in response to the messages (among other factors), simultaneous broadcasts of noise-indication messages by both sectors can lead to a "ping-pong" effect of aggregate reverse-link power, wherein the aggregate reverse-link power in both sectors alternately increases and decreases with each periodic (and simultaneous) noise-indication message. This condition can be compounded when more than two adjacent sectors share a single common group of soft handoff users, or share different common groups in pair-wise fashion.

To help avoid this ping-pong effect of simultaneous broadcasts of noise-indication messages, adjacent or geographically-nearby sectors can be configured to broadcast their respective noise-indication messages at slightly different times. This can be achieved by introducing time offsets between the periodic broadcasts from the sectors. By doing so, a sector that broadcasts later (i.e., with larger time offsets) gets a chance to observe the effects on aggregate reverse-link noise of an earlier broadcast (i.e, one with smaller time offsets), and possibly revise the content of its noise-indication message compared with what it would have broadcast at the earlier time (i.e., if broadcasts were simultaneous). In practice, the time offsets used between periodic noise-indication broadcasts from adjacent sectors are statically configured among the sectors.

While using time offsets between periodic noise-indication broadcasts from adjacent sectors can help mitigate ping-ponging of aggregate reverse-link power levels, the use of static time offsets forecloses on the possibility of considering dynamic operating conditions in the setting of time offsets. In particular, when there is a different total number of ATs in two adjacent sectors (or equivalently, a different ratio of soft handoff ATs to total ATs in the two adjacent sectors, wherein the soft handoff ATs are common to both sectors), it would be desirable to broadcast an earlier noise-indication message from the sector with the smaller total number of ATs, since responding to the message would impact a smaller number of ATs. Then if the desired effect is achieved for both sectors, it will have been achieved by effectively making the smallest possible overall adjustment to aggregate reverse-link power and corresponding data rates. Accordingly, embodiments of the present invention advantageously provide dynamic setting of the time offset for broadcasts of reverse-link noise-indication messages based on a soft handoff ratio in a cell or sector (or other form of coverage area).

Hence in one respect, various embodiments of the present invention provide, in a device configured to control a plurality of wireless coverage areas of a wireless communication system, the plurality including at least a first wireless coverage area and a second wireless coverage area, a method comprising: at the device, determining a first metric of a first ratio of a first number of first access terminals in soft handoff service within the first wireless coverage area to a first total number of access terminals in service within the first coverage area; at the device, determining a second metric of a second ratio of a second number of second access terminals in soft handoff service within the second wireless coverage area to a second total number access terminals in service within the second coverage area; and at the device, based at least on a comparison of the first and second metrics, dynamically setting a relative time difference between a first transmission of a first noise-indication message from the first wireless coverage area and a second transmission of a second noise-indication message from the second wireless coverage area, whereby the first wireless coverage area will be caused to transmit the first noise-indication message at a first transmission time and the second wireless coverage area will be caused to transmit the second noise-indication message at a second transmission time, such that the first and second transmission times will be separated by the relative time difference.

In another respect, various embodiments of the present invention provide a device configured to control a plurality of wireless coverage areas of a wireless communication system, wherein the plurality includes at least a first wireless coverage area and a second wireless coverage area, the device comprising: means for determining a first metric of a first ratio of a first number of first access terminals in soft handoff service within the first wireless coverage area to a first total number of access terminals in service within the first coverage area; means for determining a second metric of a second ratio of a second number of second access terminals in soft handoff service within the second wireless coverage area to a second total number access terminals in service within the second coverage area; and means for, based at least on a comparison of the first and second metrics, dynamically setting a relative time difference between a first transmission of a first noise-indication message from the first wireless coverage area and a second transmission of a second noise-indication message from the second wireless coverage area, whereby the first wireless coverage area will be caused to transmit the first noise-indication message at a first transmission time and the second wireless coverage area will be caused to transmit the second noise-indication message at a second transmission time, such that the first and second transmission times will be separated by the relative time difference.

In yet another respect, various embodiments of the present invention provide a tangible computer-readable medium having stored thereon computer-executable instructions that, if executed by a processor of a device configured to control a plurality of wireless coverage areas of a wireless communication system, wherein the plurality includes at least a first wireless coverage area and a second wireless coverage area, cause the device to perform functions comprising: determining a first metric of a first ratio of a first number of first access terminals in soft handoff service within the first wireless coverage area to a first total number of access terminals in service within the first coverage area; determining a second metric of a second ratio of a second number of second access terminals in soft handoff service within the second wireless coverage area to a second total number access terminals in service within the second coverage area; and based at least on a comparison of the first and second metrics, dynamically setting a relative time difference between a first transmission of a first noise-indication message from the first wireless coverage area and a second transmission of a second noise-indication message from the second wireless coverage area, whereby the first wireless coverage area will be caused to transmit the first noise-indication message at a first transmission time and the second wireless coverage area will be caused to transmit the second noise-indication message at a second transmission time, such that the first and second transmission times will be separated by the relative time difference.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

BRIEF DESCRIPTION OF THE DRAWINGS

FIG. 7 illustrates an example RAB Offset Look-Up Table that can be used in an example embodiment of dynamic reverse activity bit offset adjustment based on soft handoff ratio.

DETAILED DESCRIPTION

The present invention will be described by way of example with reference to Code Division Multiple Access ("CDMA") communications in general, and to IS-2000 and IS-856 communications in particular. As described below, IS-2000 applies to both circuit-cellular and packet-data communications, and is referred to herein simply as CDMA communications. IS-856 applies more exclusively to packet-data communications (including, e.g., real-time voice and data applications), and is referred to herein as "high rate" packet-data communications. Under IS-2000, packet-data communications are referred to as "1X-RTT" communications, also abbreviated as just "1X." However, since IS-2000 supports both circuit voice and packet data communications, the term 1X (or 1X-RTT) is sometimes used to more generally refer the IS-2000 air interface, without regard to the particular type of communication carried. Packet-data communications under IS-856 are conventionally referred to as "EVDO" communications, also abbreviated as just "DO." The terms EVDO, Rel. 0 and EVDO, Rev. A will be used herein to refer to IS-856, Rel. 0 and IS-856, Rev. A, respectively, and vice versa. Different versions of 1X-RTT may be similarly distinguished. Absent any specific version identification, EVDO will generally refer to any version of IS-856. It should be understood that the present invention can apply to other wireless voice and data protocols including, without limitation, IS-95 and GSM, which, together with IS-2000 and IS-856 are considered herein, individually or in any combination, to comprise a CDMA family of protocols.

Figure 1:
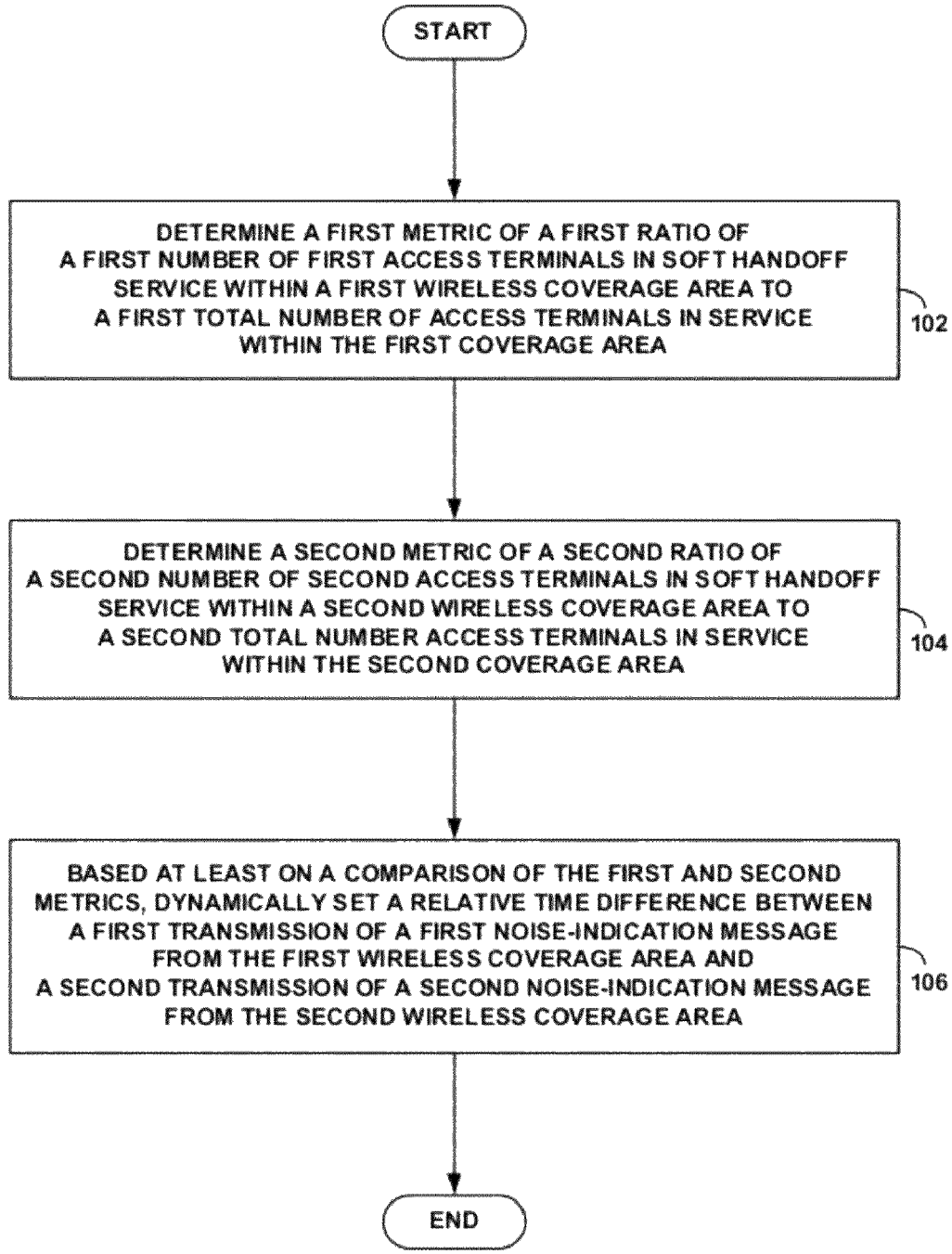
FIG. 1 is a flowchart illustrating an example embodiment of dynamic reverse activity bit offset adjustment based on soft handoff ratio.

FIG. 1 is a flowchart illustrating an example embodiment of dynamic reverse activity bit offset adjustment based on soft handoff ratio. By way of example, the steps of the flowchart could be implemented in a device, such as a base station or base station controller, that is part of a wireless communication system, and that is configured to control a plurality of wireless coverage areas, examples of which include cells, sectors, or the like. The plurality of wireless coverage areas is taken to include at least a first wireless coverage area and a second wireless coverage area. In accordance with the example embodiment, the wireless communication system, including the base station, cells, sectors, etc., is configured to operate according to a CDMA family of protocol, including at least IS-856, Rel. 0. For the purposes of the present discussion, a sector will be taken as a representative example of a wireless coverage area, and the two will generally be referred to interchangeably, with the understanding that the embodiments disclosed herein are not limited to only this form of wireless coverage area, and that others (e.g., cells) could be used.

At step 102, the control device determines a first metric of a first ratio of a first number of first access terminals in soft handoff service within the first wireless coverage area to a first total number of access terminals in service within the first wireless coverage area. More specifically, an AT that is in soft handoff service is one that is engaged in a communication session or call via more than one sector at the same time. As described below, the sectors within which the AT is in soft handoff service comprise the AT's "active set." Depending on the type of communication and the air interface protocol (e.g. 1X-RTT, EVDO, etc.), the AT may receive forward-link data transmissions from its active set sectors either simultaneously or one at a time. Similarly, the AT can transmit on its reverse link to all of its active set sectors simultaneously. The AT can also receive various control communications concurrently from all of its active set sectors.

Multiple ATs can be in soft handoff service at any one time within a given sector, meaning that the given sector is in the respective active set of each of the multiple ATs. The other sectors in each respective active set of each of the multiple ATs are not necessarily the same. As such, the first access terminals in soft handoff service within the first wireless coverage area referred to in step 102 identifies a particular group of access terminal, namely the "first access terminals," each of which is in soft handoff with a particular wireless coverage area, namely the "first wireless coverage area." The first wireless coverage area could be a particular cell or sector, as discussed above. Step 102 also identifies a particular number of first access terminals that are in soft handoff within the first wireless coverage area, namely the "first number."

In addition to the first number of first access terminals in soft handoff service within the first wireless coverage area, there is also a "first" total number of access terminals in service within the first wireless coverage area. These could comprise other access terminals in soft handoff within the first wireless coverage area, but ones that are not included in the particular group identified as the "first access terminals" at step 102. These could also comprise access terminals that are in "primary service" within the first wireless coverage area. More particularly, a given access terminal in primary service within a given sector is one that is engaged in a communication session or call via only that given sector at any one time. As such, the active set of the given access terminal will contain only the given sector. Multiple access terminals could be in primary service within a particular sector at any one time.

As designated at step 102, a particular ratio is identified, namely the "first ratio," specified as the ratio of the first number to the first total number. Also designated at step 102 is a particular metric of the first ratio is identified, namely the "first metric." The term "metric" as used herein refers to some form of functional measure of a quantity or variable. Hence, the first metric is a functional measure of the first ratio. In accordance with the example embodiment, the first metric could be equal to the first ratio, in which case the functional measure of the first ratio would be the first ratio itself. However, other forms of first metric could be used without limitation with respect to the present invention or embodiments thereof. For instance, the first metric of the first ratio could be a ratio of the first number of first access terminals in soft handoff service within the first wireless coverage area to all other access terminals in service within the first wireless coverage area.

At step 104, the control device determines a second metric of a second ratio of a second number of second access terminals in soft handoff service within the second wireless coverage area to a second total number of access terminals in service within the second coverage area. The discussion above of step 102 applies as well to step 104, except that step 104 identifies a "second number" of "second access terminals" in soft handoff service within the "second wireless coverage area," as well as a "second total number" of access terminals in service within the second wireless coverage area, and a "second metric" of a "second ratio" of the second number to the second total number.

As described above, the device is configured to control the plurality of wireless coverage areas that includes both the first and second wireless coverage areas, and in accordance with the example embodiment could be a BSC or an RNC. As such, it will manage and/or mediate handoffs of access terminals among the plurality of wireless coverage areas. In this role, the BSC (or RNC) will typically maintain or otherwise have access to the information it needs to make the determinations of steps 102 and 104. Hence, the device (BSC, RNC, or the like) will be able to determine the numbers of access terminals in soft handoff service and in primary service in each of the wireless coverage areas of the plurality, as well as various totals, ratios, and metrics specified in the two steps.

At step 106, the control device compares the first and second metrics, and based at least on the comparison, dynamically sets a relative time difference between a first transmission of a first noise-indication message from the first wireless coverage area and a second transmission of a second noise-indication message from the second wireless coverage area. In doing so, the first wireless coverage area will be caused to transmit the first noise-indication message at a first transmission time and the second wireless coverage area will be caused to transmit the second noise-indication message at a second transmission time, such that the first and second transmission times will be separated by the relative time difference. More particularly, the control device will set both a first relative time offset between the first transmission time and a reference time and a second relative time offset between the second transmission time and the reference time, wherein the first and second relative time offsets are both measured positively from the reference time. That is, the first transmission time will be set beyond the reference time by an amount equal to the first relative time offset, and the second transmission time will be set beyond the reference time by an amount equal to the second relative time offset. The first and second relative time offsets will be set such that time between the first and second transmission times is the relative time difference.

In accordance with the example embodiment, wherein the control device is a BSC or an RNC and configured to operate according to a CDMA family of protocols, including at least IS-856, Rel. 0, and wherein each wireless coverage area comprises is a cell or sector, the first noise-indication message will be a first reverse activity bit (RAB) set and broadcast by the first cell or sector, and the second noise-indication message will be a second RAB set and broadcast by the second cell or sector. As is known in the art, a given sector sets the RAB to one of two (binary) values depending on whether the given sector measures reverse-link noise to be above or below a threshold level. The RAB is then broadcast (transmitted) on the Reverse Activity Sub-Channel of the sector's forward link to all access terminals being served by the given sector.

Access terminals engaging in active IS-856, Rel. 0 sessions via their respective serving sectors respond to each RAB broadcast from their serving sectors in such a way that tends to decrease aggregate reverse-link power if the RAB corresponds to reverse noise that exceeds the threshold, and increase aggregate reverse-link power if the RAB corresponds to aggregate reverse-link noise that does not exceed the threshold. Correspondingly, aggregate (as well as per-AT) reverse-link noise and aggregate (as well as per-AT) reverse-link data rates will tend to decrease and increase with aggregate (as well as per-AT) reverse-link power. An active terminal in soft handoff will receive a periodic RAB broadcast from each sector in its active set, and will respond to each, giving priority to RABs that correspond to aggregate reverse-link noise in excess of the threshold. Consequently, the response of the AT to a RAB from one active-set sector will impact the aggregate reverse-link noise in each of the AT's active-set sectors.

Each sector sets and broadcasts the RAB periodically, typically with rate of at least once per frame, wherein the start of each frame is synchronized across all sectors (and/or cells) of a wireless communication system. The transmission time of any given RAB broadcast having a rate of once per frame from any given sector is determined as a "RAB offset" from the start of a frame. For rates in multiples of once per frame, the RAB offset corresponds to an offset of the first of the multiple-per-frame broadcasts from the start of the frame.

In further accordance with the example embodiment, the reference time will be the start of a frame, and the first and second relative time offsets will be first and second RAB offsets, respectively, of first and second RAB broadcasts from the first and second sectors, respectively. The control device, (BSC or RNC) will thus dynamically set the first and second RAB offsets based at least on the comparison of the first and second metrics. Although RAB offsets may be employed in conventional operation of wireless communication system, they configured statically. In contrast, setting RAB offsets dynamically based at least on the comparison of the first and second metrics advantageously allows dynamic conditions related to relative traffic load in different sectors to be accounted for in adjusting RAB offsets of the different sectors.

More particularly, taking the first and second metrics to be the first and second ratios, respectively, and further taking the first access terminals to be the same as the second access terminals (i.e., taking the first and second access terminals to refer to a single, common group of access terminals that are concurrently in soft handoff within both the first and second wireless coverage areas), comparing the first and second metrics then yields a comparison of the first and second total numbers of access terminals in service in each of the first and second wireless coverage areas. That is, taking the first and second access terminals to be the same means that the numerators of the first and second ratios are the same, so that the first and second ratios can differ only in their respective denominators; i.e., only in their respective total numbers. Thus, in this case, any difference between the first and second ratios corresponds to a difference in the first and second total numbers. In particular, if the first ratio is larger than the second ratio, then the first total number is smaller than the second total number. Conversely, of the first ratio is smaller than the second ratio, then the first total number is larger than the second total number.

In accordance with the example embodiment, the first RAB offset will be set to a larger value than the second RAB offset if the first ratio is smaller than the second ratio, and conversely, the first RAB offset will be set to a smaller value than the second RAB offset if the first ratio is larger than the second ratio. Equivalently, the second RAB offset will be set to a larger value than the first RAB offset if second ratio is smaller than the first ratio, and conversely, the second RAB offset will be set to a smaller value than the first RAB offset if second ratio is larger than the first ratio. These two conditions amount to setting a larger RAB offset for the sector that has a larger total number of access terminals being served. By doing so, the sector with the larger total number of access terminals will have a chance to observe if the earlier RAB broadcast of the sector with the smaller total number of access terminals results in a change in aggregate reverse-link noise in the sector with the larger total number of access terminals. If so, and if that change enables the sector with the larger total number of access terminals to switch its RAB value from what it would have broadcast before observing the effect of the earlier RAB broadcast, then the result will effectively be to have advantageously achieved a desired adjustment to reverse-link noise while impacting the smallest number of access terminals.

In particular, if both sectors set the RAB according to aggregate reverse-link noise that exceeds the threshold, then the result of each RAB broadcast will tend to be reduced reverse-link noise each sector. However, this result will come at the expense of generally reduced reverse-link data rates in each sector, wherein the impact of the reduced data rates will be borne generally by all the active ATs in each sector. By dynamically adjusting the RAB offsets of each sector as described above, the sector with the smaller total number of ATs will broadcast its RAB earlier than the sector with the larger total number of ATs. Since at least a portion of the total number of ATs in each sector is a common group of ATs in soft handoff service within both sectors, the result of the earlier broadcast will tend to reduce reverse-link noise even in the sector that has not yet broadcast its RAB (i.e., the sector with the larger RAB offset). If this result is achieved sufficiently prior to the later broadcast as to allow the effect to be measured by the sector with the larger offset, and if the measurement indicates reverse-link noise below the threshold, then the sector with the larger offset can forgo broadcasting a RAB that would have tended to reduce the reverse-link data rates of the ATs being served by that sector. Since the sector with smaller RAB offset also has the smaller total number of active ATs, the decrease in reverse-link data rates (via reduced reverse-link power) advantageously impacted the smaller total number of access terminals.

While the effect in one sector of aggregate reverse-link power adjustment carried out in a another sector may include a contribution from ATs that are not in common soft handoff in both sectors, the predominant contribution is likely to be from those ATs that are in common soft handoff in both sectors. Accordingly, the number of access terminals in soft handoff service within the first and second wireless coverage areas (i.e., the first and second numbers in steps 102 and 104, respectively) will be an additional consideration in the example embodiment. More particularly, dynamically setting the relative time difference (i.e., the RAB offset) at step 106 will further be based on each of the first number and the second number exceeding a threshold number, in addition to being based at least on the comparison of the first and second metrics. If the threshold condition is not met, the RAB offsets for each sector could be determined conventionally, for instance according to static, configured RAB offsets. Example values of the threshold number could be 10, 15, or 20. It will be appreciated that other values could be used as well.

Since RAB broadcasts in each sector are periodic with a rate of at least once per frame and with a per-sector RAB offset measured from start of system-synchronous frames, each AT needs to know the RAB offset for each sector in its active set in order to be able to properly detect RAB broadcasts from its active-set sectors. In accordance with the example embodiment, the control device (BSC or RNC) will cause the first wireless coverage area to transmit an update message including an indication of the first RAB offset to all access terminals being served by the first wireless coverage area. Similarly, the control device (BSC or RNC) will cause the second wireless coverage area to transmit an update message including an indication of the second RAB offset to all access terminals being served by the second wireless coverage area.

While the above discussion describes the example embodiment with respect to two wireless coverage areas—i.e., the first and second—the method can be extended to include more than two wireless coverage areas (e.g., more than two sectors). More particularly, the plurality of wireless coverage areas can be taken to further include a third wireless coverage area (e.g., a third sector). Then, in accordance with the example embodiment, the actions of step 102 can be extended such that the control device determines a third metric of a third ratio of a third number of third access terminals in soft handoff service within the third wireless coverage area to a third total number of access terminals in service within the third coverage area. The discussion above of step 102 applies as well to this extended description, except the extended description identifies a "third number" of "third access terminals" in soft handoff service within the "third wireless coverage area," as well as a "third total number" of access terminals in service within the third wireless coverage area, and a "third metric" of a "third ratio" of the third number to the third total number.

In further accordance with the example embodiment, the actions of step 106 can be extended such that the control device compares the first, second, and third metrics, and based on a comparison, dynamically sets an additional relative time difference between a third transmission of a third noise-indication message from the third wireless coverage area and either one of the first and second transmission times. More specifically, the control device (e.g., BSC or RNC) dynamically adjusts a third RAB offset for a third RAB broadcast from the third sector, wherein the value of the third RAB offset is set based at least on the comparison of the first, second, and third metrics.

In the discussion of FIG. 1, as well as in other discussions and explanations herein, the terms "first," "second," and "third" as applied to "wireless coverage areas," "numbers," "access terminals," "metrics," "ratios," "relative time offsets," etc., are used as identifying labels, and not meant to imply any numerical ordering (although a numerical ordering is not necessarily excluded). It will also be appreciated that the steps of FIG. 1 are shown by way of example, and that additional and/or alternative steps or alternative ordering of steps could be carried out and still remain within the scope and spirit of the present invention and embodiments thereof.

Figure 2:
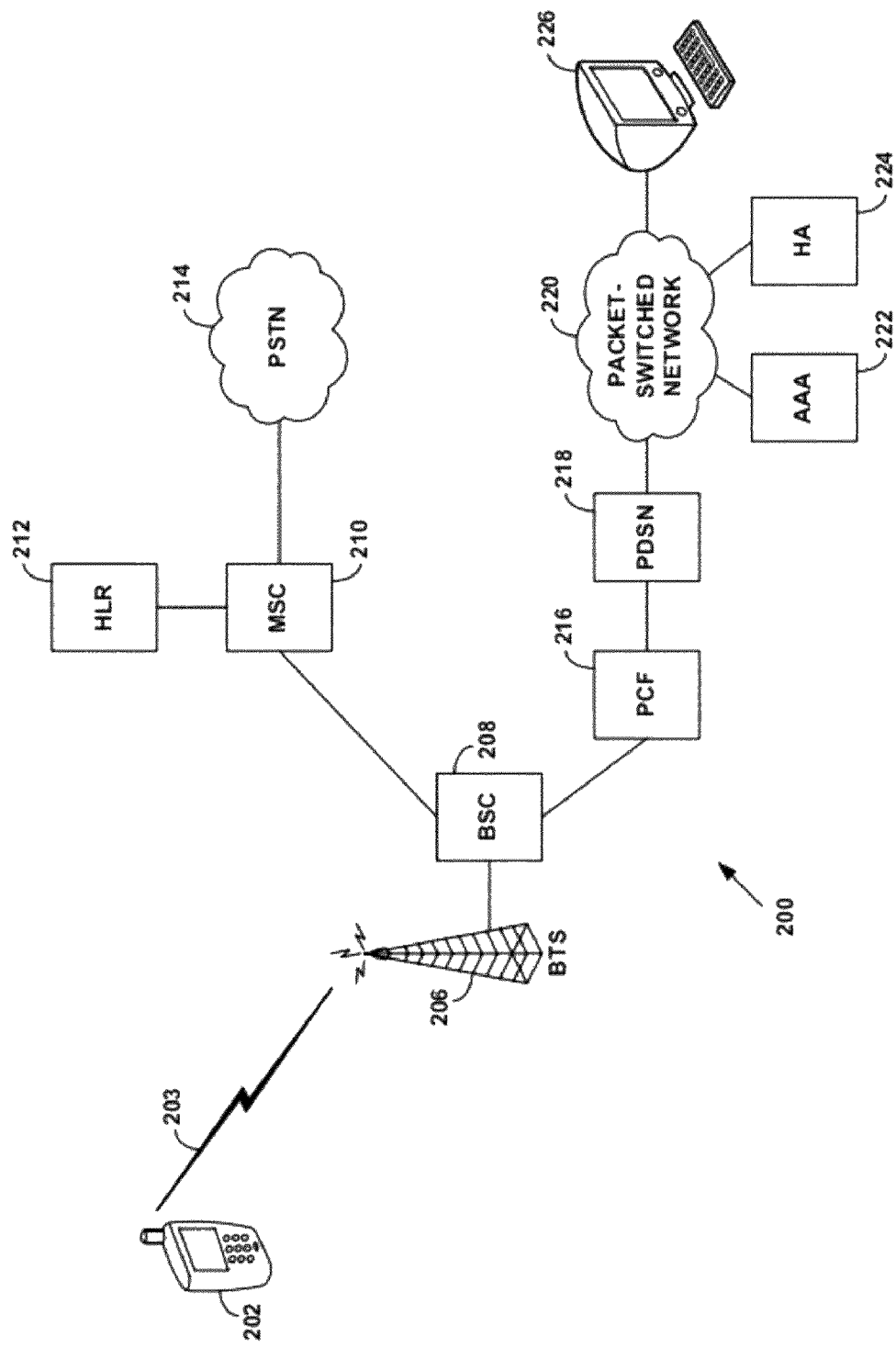
FIG. 2 is a simplified block diagram of a wireless communication system in which an example embodiment of dynamic reverse activity bit offset adjustment based on soft handoff ratio can be employed.

FIG. 2 shows a simplified block diagram of a wireless communication system 200 in which an example embodiment of dynamic reverse activity bit offset adjustment based on soft handoff ratio can be employed. Access terminal AT 202 communicates over an air interface 203 with a BTS 206, which is then coupled or integrated with a BSC 208. Transmissions over air interface 203 from BTS 206 to AT 202 represent the forward link to the access terminal (also referred to herein alternatively as the forward link from the base station, and as "the AT's forward link"). Transmissions over interface 203 from AT 202 to BTS 206 represent the "reverse link" (also referred to herein as "the AT's reverse link").

The BSC 208 is connected to an MSC 210, which acts to control assignment of air traffic channels (e.g., over air interface 203), and provides access to wireless circuit-switched services such as circuit-voice and circuit-data (e.g., modem-based packet data) service. As represented by its connection to PSTN 214, MSC 210 is also coupled with one or more other MSCs or other telephony circuit switches in the operator's (or in a different operator's) network, thereby supporting user mobility across MSC regions, and local and long-distance landline telephone services. Also connected to MSC 210 is home location register (HLR) 212, which supports mobility-related aspects of subscriber services, including dynamic tracking of subscriber registration location and verification of service privileges.

As shown, BSC 208 is also connected with a PDSN 218 by way of packet control function (PCF) 216. PDSN 218 in turn provides connectivity with a packet-switched network 220, such as the Internet and/or a wireless carrier's private core packet-network. Sitting as nodes on network 220 are, by way of example, an authentication, authorization, and accounting (AAA) server 222, a mobile-IP home agent (HA) 224, and a remote computer 226. After acquiring an air traffic channel over its air interface, an access terminal (e.g., AT 202) may send a request to PDSN 218 for a connection in the packet data network. Then, following authentication of the access terminal by AAA server 222, the access terminal may be assigned an IP address by the PDSN or by HA 224, and may thereafter engage in packet-data communications with entities such as remote computer 226.

It should be understood that the depiction of just one of each network element in FIG. 2 is illustrative, and there could be more than one of any of them, as well as other types of elements not shown. The particular arrangement shown in FIG. 2 should not be viewed as limiting with respect to the present invention or embodiments thereof. Further, the network components that make up a wireless communication system such as system 200 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network, and operable to transmit and receive the communications and messages described herein, and one or more computer hardware, firmware, or software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as exemplary access terminal 202 typically comprises a user-interface, I/O components, a communication interface, a tone detector, a processing unit, and data storage, all of which may be coupled together by a system bus or other mechanism. As such, system 200, AT 202, and air interface 203 collectively are representative of example means of implementing and carrying out the various functions, steps, and procedures described herein.

Figure 3:
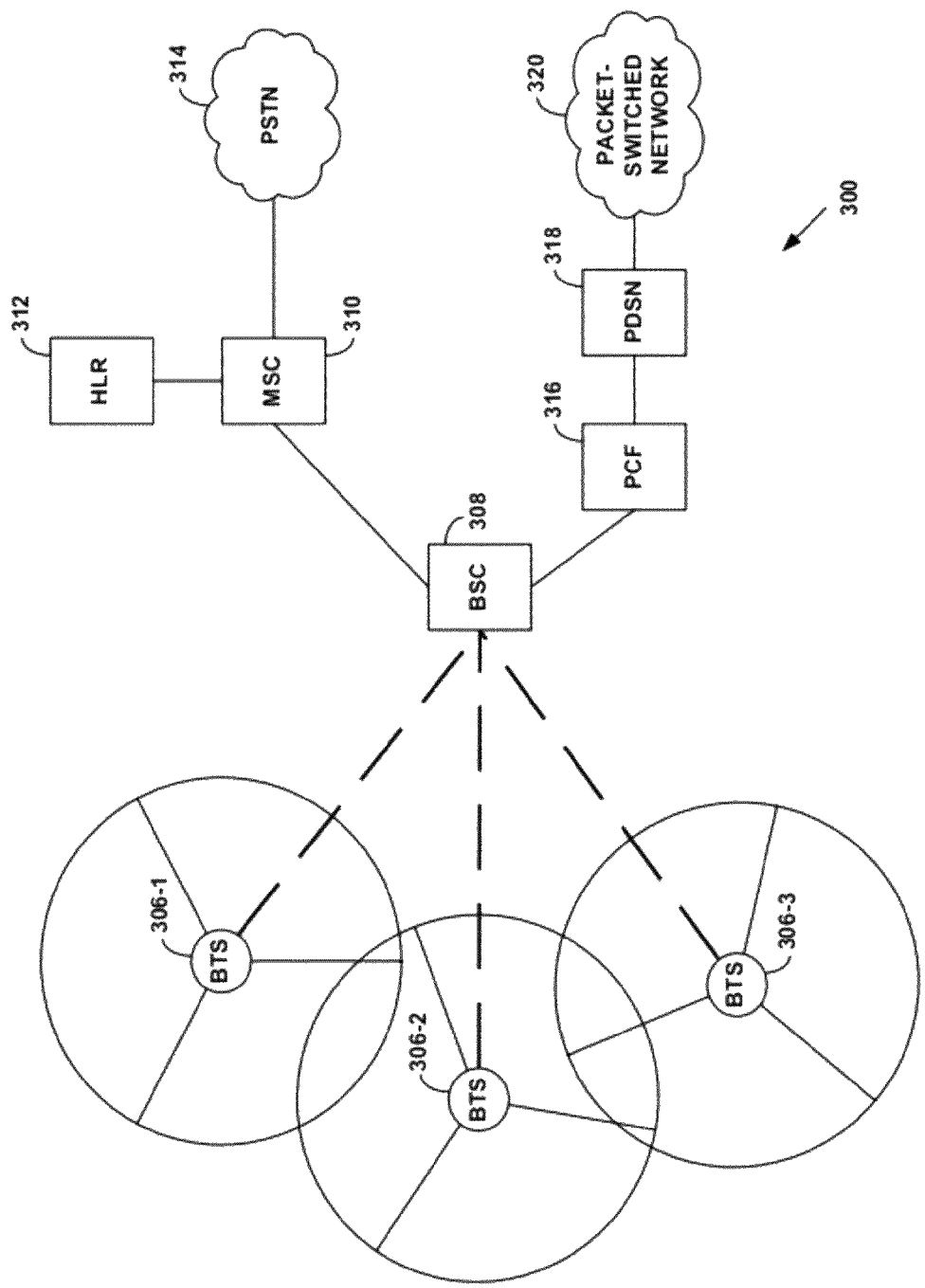
FIG. 3 is a simplified block diagram illustrating an example configuration of physical sectors in a wireless communication system in which an example embodiment of dynamic reverse activity bit offset adjustment based on soft handoff ratio can be employed.

In practice, a BSC may serve multiple BTSs, each of which may then radiate to define a given cell and a plurality of cell sectors. This arrangement is illustrated by way of example in FIG. 3, which shows BSC 308 in network 300 coupled with three BTSs 306-1, 306-2, and 306-3. Each BTS is shown at the core of a respective circle representing a cell, and each cell is divided into three pie-pieces representing wireless service sectors. With this arrangement, an access terminal can operate in any of the sectors and can connect, via a serving BTS, with MSC 310 for circuit-based services in the wireless communication system and beyond (e.g., in PSTN 314). As shown in FIG. 3, MSC 310 is connected to BSC 308, HLR 312, and PSTN 314. Through its serving sector, an access terminal can also communicate, via PCF 316 and PDSN 318, on packet network 320. Note that the depiction of three wireless services sectors for each of the BTSs in FIG. 3 is shown by way of example, and other numbers of sectors per BTS are possible. Further, the relative positions of the BTSs and the relative angular orientations of the wireless service sectors are also illustrative, and other arrangements may be used.

Throughout this description, the term "base station" will be used to refer to a Radio Access Network (RAN) element such as a BTS, a BSC, or combination BTS/BSC, for instance. The term "radio network controller" (RNC) can also be used to refer to a BSC, or more generally to a base station. In some arrangements, two or more RNCs may be grouped together, wherein one of them carries out certain control functions of the group, such as coordinating handoffs across BTSs of the respective RNCs in the group. The term controlling RNC (or C-RNC) customarily applies to the RNC that carries out these (and possibly other) control functions.

1. Conventional CDMA Communications

In a conventional CDMA wireless network compliant with the well known IS-2000 standard, each cell employs one or more carrier frequencies, typically 1.25 MHz in bandwidth each, and each wireless service sector is distinguished from adjacent sectors by a pseudo-random number offset ("PN offset"). Further, each sector can concurrently communicate on multiple different channels, distinguished from each other by "Walsh codes." When an access terminal operates in a given sector, communications between the access terminal and the BTS of the sector are carried on a given frequency and are encoded by the sector's PN offset and a given Walsh code.

Air interface communications are divided into forward link communications, which are those passing from the base station to the access terminal, and reverse link communications, which are those passing from the access terminal to the base station. In an IS-2000 system, data are transmitted in units of frames on both the forward link and reverse link. On either link, communications in a given wireless service sector are encoded with the sector's PN offset and a given Walsh code. On the forward link, certain Walsh codes are reserved for use to define control channels, including a pilot channel, a sync channel, and one or more paging channels, and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

Concurrent communication in multiple forward-link channels on a common frequency in a sector is supported by allocating each channel a fraction of the total forward-link power available in the sector. The power allocated to each channel is determined so as to optimize the signal-to-noise characteristics of all the channels, and may vary with time according to the number of access terminals being serviced, and their relative positions with respect to the BTS, among other factors. Similarly, on the reverse links, each access terminal transmits at a power level that optimizes the signal-to-noise while minimizing interference with other access terminals.

In order to facilitate efficient and reliable handoff of access terminals between sectors, under IS-2000 an AT can communicate on a given carrier frequency with a number of "active" sectors concurrently, which collectively make up the AT's "active set." Depending on the system, the number of active sectors can be up to six (currently). The access terminal receives largely the same signal from each of its active sectors and, on a frame-by-frame basis, selects the best signal to use. An AT's active set is maintained in the access terminal's memory, each active sector being identified according to its PN offset. The AT continually monitors the pilot signals from its active sectors as well as from other sectors, which may vary in as the AT moves about within the wireless communication system, or as other factors cause the AT's RF conditions to change. The AT reports the received signal strengths to the serving base station, which then directs the AT to update its active set in accordance with the reported strengths and one or more threshold conditions.

Operationally, an IS-2000 system is arranged to transmit the same data concurrently on a given carrier frequency in some or all of the sectors of a given AT's active set, encoding each transmission according to the PN offset of the respective sector and the Walsh code for the assigned channel therein. Correspondingly, the AT recognizes the concurrent transmissions according to the PN offsets of the sectors in its active set and the Walsh codes of its assigned channels. That is, operating under IS-2000, the AT will decode transmissions using all the PN offsets in its active set, together with the respective Walsh codes assigned for each PN-identified sector. The concurrent transmissions in sectors of the AT's active set provides an added level of reliability to communications, as well as possibly increased quality owing to improved signal to noise characteristics. The concurrency also facilitates soft handoff between sectors, as described above. A soft handoff between sectors the same BTS is referred to as a "softer handoff."

With the arrangement described above, an access terminal can engage in cellular voice and/or in packet-data communications. Referring again to FIG. 2, and taking an originating call from AT 202 as an example, AT 202 first sends an origination request over air interface 203 and via the BTS 206 and BSC 208 to MSC 210. The MSC then signals back to the BSC directing the BSC to assign an air interface traffic channel for use by the access terminal. For a voice call, the MSC uses well-known circuit protocols to signal call setup and establish a circuit connection to a destination switch that can then connect the call to a called device (e.g., landline phone or another access terminal). For a packet-data session (i.e., 1X-RTT), the BSC signals to the PDSN 218 by way of PCF 216. The PDSN 218 and access terminal 202 then negotiate to establish a data link layer connection, such as a point to point protocol (PPP) session. Further, the PDSN 218 sends a foreign agent advertisement that includes a challenge value to the access terminal, and the access terminal responds with a mobile-IP registration request (MIP RRQ), including a response to the challenge, which the PDSN forwards to HA 224. The HA then assigns an IP address for the access terminal to use, and the PDSN passes that IP address via the BSC to the access terminal.

2. High Rate Packet-Data Communications

Under IS-2000, the highest rate of packet-data communications theoretically available on a fundamental traffic channel of the forward link is 9.6 kbps, dependent in part on the power allocated to the forward-link traffic channel and the resultant signal-to-noise characteristics. In order to provide higher rate packet-data service to support higher bandwidth applications, the industry introduced a new "high rate packet data (HRPD) system," which is defined by industry standard IS-856.

IS-856 leverages the asymmetric characteristics of most IP traffic, in which the forward link typically carries a higher load than the reverse link. Under IS-856, each access terminal maintains and manages an active set as described above, but receives forward-link transmission from only one active sector at a time. In turn, each sector transmits to all its active ATs on a common forward link using time division multiplexing (TDM) in order to transmit to only one access terminal at a time, but at the full power of the sector. As a result of the full-power allocation by the sector, an access terminal operating under IS-856 can, in theory, receive packet-data at a rate of at least 38.4 kbps and up to 2.4 Mbps on its forward link.

TDM access on the IS-856 forward link is achieved by dividing the forward link in the time domain into time slots of length 2048 chips each. At a chip rate of 1.228 Mega-chips per second, each slot has a duration of 1.67 milliseconds (ms), or a rate of 600 time slots per second. Every 16 slots comprise a frame, corresponding to 26.67 ms per frame, and frame boundaries are synchronous across all sectors of a RAN.

Each time slot is further divided into two 1024-chip half-slots, each half-slot arranged to carry a 96-chip pilot "burst" (pilot channel) at its center and a Medium Access Control (MAC) channel in two 64-chip segments, one on each side of the pilot burst, for 256 MAC-channel chips per slot. The MAC channel is further subdivided into a Reverse Activity sub-channel, a "data rate control" (DRC) Lock sub-channel, an ARQ sub-channel, and a reverse power control (RPC) sub-channel. The remaining 1600 chips of each time slot (800 per half-slot) are allocated for a forward traffic channel or a forward control channel, so that any given time slot will carry either AT-specific traffic-channel data (if any exists) or AT-specific control-channel data. While the 1600 chips of forward-link traffic and/or control channel data of any given time slot are designated on a TDM basis to a specific access terminal, the MAC channel chips are encoded using different Walsh codes in order to broadcast different MAC sub-channels concurrently over the same MAC-channel chips and/or to transmit different AT-specific MAC-sub-channel data concurrently to different ATs on the same MAC-channel chips. As in IS-2000, each sector in IS-856 is defined by a PN offset, and the pilot channel carries an indication of the sector's PN offset.

The reverse link under IS-856 retains largely the traditional IS-2000 code division multiplexing (CDM) format, albeit with the addition of a "data rate control" (DRC) channel used to indicate the supportable data rate and best serving sector for the forward link. Multiple, active ATs in a common serving sector can transmit concurrently on their respective reverse links to the sector's BTS. Each reverse link comprises distinct code channels, thereby enabling the BTS to distinguish among each AT's transmissions. As with IS-2000, the IS-856 reverse link transmissions are frame-based.

The IS-856 reverse link includes an access channel and a traffic channel. The access channel is used by an AT that is not in a connected state (i.e., not in an active data session) to signal to the RAN in order to establish a data session. The traffic channel is used by an AT in a connected state to transmit data, as well as signaling and control information, to the RAN. Both the access and traffic channels include the pilot signal that serves as beacon signal for identifying the AT to the RAN and for establishing and maintaining a timing reference for decoding other signals received at the RAN from the AT. Packet-data rates achievable on the reverse-link traffic channel depend on the version of IS-856; under Rel. 0, an AT can achieve a maximum reverse-link burst rate of 153.6 kilobits per second (kbps), while under Rev. A, an AT achieve a maximum reverse-link burst rate of 1.8 Megabits per second (Mbps).

Power control of the reverse link under IS-856 employs one or more feedback procedures by which an AT adjusts its reverse-link power and data rates in response to commands from the AT's serving sector that are aimed at maintaining a particular AT-specific reverse-link error rate within an AT-specific threshold error rate, or at maintaining an aggregate reverse-link noise level below a threshold noise level. In particular, each sector periodically broadcasts a RAB on its Reverse Activity sub-channel, wherein the value of the RAB depends on the aggregate reverse-link noise measured by sector. An AT responds to each RAB received from each of its active-set sectors by adjusting the transmission power and/or transmission rates of its reverse data channel according to procedures compliant with one or another of Rel. 0 and Rev. A versions. In particular, the AT adjusts its data channel transmission power and transmission rate relative to its pilot power level based on the RAB received from the sector and on the particular protocol version.

More specifically, the sector continually measures an aggregate of reverse link transmission power and every 1.67 ms (i.e., every time slot) computes a noise metric referred to as reverse noise rise (RNR). RNR is the difference between (i) the reverse noise that the access node is currently detecting and (ii) a baseline level of reverse noise. Thus, the sector computes how far the reverse noise has risen above that baseline. When the computed RNR exceeds a threshold RNR value, the sector sets the RAB to one; when the computed RNR does not exceed the threshold RNR value, the sector sets the RAB to zero. The RNR threshold is a configurable system parameter that can range from 0 dB to 30 dB. Hence, a RAB set to one corresponds to higher reverse-link noise (and less favorable RF conditions), while a RAB set to zero corresponds to lower reverse-link noise (and more favorable RF conditions).

The sector periodically broadcasts the RAB to served access terminals on its Reverse Activity sub-channel at a rate typically in multiples of once per frame up to a maximum of 16 times per frame, corresponding to once per time slot. Each broadcast is sustained over an integer number of consecutive time slots of a frame. The integer number is set in a parameter conventionally referred to as "RABlength." An AT with an active EVDO data session will, in turn, adjust its data channel power level and transmission rate according to the received RAB.

Under IS-856, Rel. 0, an AT can transmit on its reverse link at one of five rates: 9.6 kbps, 19.2 kbps, 38.4 kbps, 76.8 kbps, and 153.6 kbps. The consecutive order of the listed rates defines the order in which the AT may transition between rates. At the start of a data session, the AT transmits at 9.6 kbps, then over the course of the session transitions among the other rates based on received RABs and a transition probability integer for each transition. Specifically, the AT will transition up or down from its current rate to the next consecutive higher or lower rate depending on the value (one or zero) of the RAB and based on a probabilistic test that controls whether or not to make the transition. For a RAB set to one, the AT will transition from its current rate to the next lower rate with a probability determined by the outcome of a test for the particular downward transition. Conversely, for a RAB set to zero, the AT will transition from its current rate to the next higher rate with a probability determined by the outcome of a test for the particular upward transition. When the RAB of any one of the AT's active-set sectors is one, the AT treats the RAB of all of its active-set sectors as being set to one.

Each probability test is a uniform random selection of an integer between 0 and 255. If the selected integer is smaller than a transition probability integer (also in the range between 0 and 255) for the particular current-to-new rate pair, the AT transitions up or down to the next rate. If the selected integer is not smaller than the transition probability integer, the AT remains at its current rate. The AT then sets its reverse-link data channel transmission power to accommodate the selected rate. If a given increased data rate requires a higher transmission power than the AT is allowed at a particular time, the AT will not make the upward transition.

Under IS-856, Rev. A, an AT sets its reverse-link data channel transmission power according to a ratio of reverse traffic channel power to revere pilot channel power, referred to as "T2P." More specifically, the AT tracks a short-term and a long-term historical indicator of RAB values reported by the base station in order to dynamically adapt T2P for more rapid changes in data rate. Briefly, Rev. A reverse power control treats T2P like a resource, and invokes a mechanism for resource allocation and management that is sometimes referred as a "token bucket." An amount "BucketLevel" of T2P resource in the bucket at any time is a function of an amount "T2PInflow" of T2P resource the AT adds to the bucket added to the bucket and an amount "T2POutflow" the AT uses from the bucket. The AT determines T2PInflow as a function of the short-term RAB indicator, referred to as "QRAB," the long-term RAB indicator, referred to as "FRAB," and the pilot strength of the forward link from the base station (i.e., BTS in the cell or sector).

From the T2P inflow and current BucketLevel, the AT determines an amount of T2P resource that can be used at a given time during a transmission. The AT then sets a packet size and a transmission power level based on the amount of T2P resource that can be used. Note that this amount can sometimes momentarily exceed the inflow rate, and thereby occasionally accommodate high rate data bursts. Also, since the frame size is generally fixed, packet size corresponds to a data density and therefore a data rate; i.e., a larger packet size corresponds to a higher data rate, and vice versa. Under IS-856, Rev. A, effective reverse-link data rates can range from 19.2 kbps up to 1.84 megabits per second (Mbps).

Operation in an IS-856 compliant communication system may be illustrated, again with reference to FIG. 2. To acquire packet data connectivity under IS-856, after an access terminal first detects an EVDO carrier, the access terminal sends to its BSC (or RNC) 208 a UATI (Universal Access Terminal Identifier) request, and receives in response an UATI, which the access terminal can then use to identify itself in subsequent communications with the BSC. The access terminal then sends a connection-request to the BSC 208, and the BSC responsively invokes a process to authenticate the access terminal and to have the access terminal acquire a data link.

In particular, the BSC 208 sends an access request to an Access Network AAA (ANAAA) server (which may be different than the AAA server 222), and the ANAAA server authenticates the access terminal. The BSC 208 then assigns radio resources for the data session, providing a MAC identifier ("MAC ID") to the AT for identifying its time-slot data sent in the forward-link traffic channel, and a Walsh code for a sending data on the reverse-link traffic channel. Further, the BSC signals to the PDSN 218 (via PCF 216), and the PDSN and access terminal then negotiate to establish a PPP data link. In addition, as in the IS-2000 process, the access terminal then sends an MIP RRQ to the PDSN, which the PDSN forwards to the HA 224, and the HA assigns a mobile-IP address for the access terminal to use.

3. Dynamic Adjustment of Reverse Activity Bit Offset
   a. Operating Principles

Under both IS-856, Rel. 0 and IS-856, Rev. A, the reverse power-control procedures are based on one form or another of RAB monitoring by the AT. Since the RAB is an indicator of aggregate reverse-link noise (i.e., RNR), the reverse power-control procedures can be understood as helping to balance the reverse power and data rates achievable by the AT with the AT's contribution to the aggregate reverse-link noise from all ATs served by the base station. In other words, reverse power-control procedures comprise a feedback mechanism, with the RAB acting as a feedback variable.

As described above, the response of a given AT under either protocol version to a RAB from a given sector will not necessarily yield an immediate decrease or increase in the AT's reverse traffic channel power level. However, the response of the given AT will not be the opposite of that intended by the RAB, and the aggregate of the average response of all active ATs in the given sector will be in accordance with that intended by the RAB. That is, a RAB of one will result in net decrease in reverse-link noise in the given sector, while a RAB of zero will result in a net increase in reverse-link noise in the sector.

Also as described above, the aggregate reverse-link noise in a given sector can include contributions from access terminals in nearby or neighboring sectors. This is particularly the case when some of the ATs with active EVDO sessions in the given sector are in soft handoff in both that sector and in one or more nearby or neighboring sectors. Since each AT in soft handoff in the given sector will respond to RAB broadcasts from all of its respective active-set sectors, the aggregate response in the given sector and in one or more of the nearby sectors serving common ATs in soft handoff can result in a ping-ponging of RNR. This will cause the given sector and one or more neighboring sectors to broadcast alternating RAB values, which in turn will tend to cause ATs to ping-pong their reverse traffic channel power levels. The net impact can be reduced efficiency and degradation of service quality. Introduction of different RAB offsets for different sectors located nearby one another can help mitigate this problem, but as implemented conventionally, RAB offsets cannot account for dynamic changes in relative traffic loads among neighboring sectors. Accordingly, example embodiments of the present invention provide for dynamic reverse activity bit offset adjustment based on soft handoff ratio.

b. Example Operation

Figure 4:
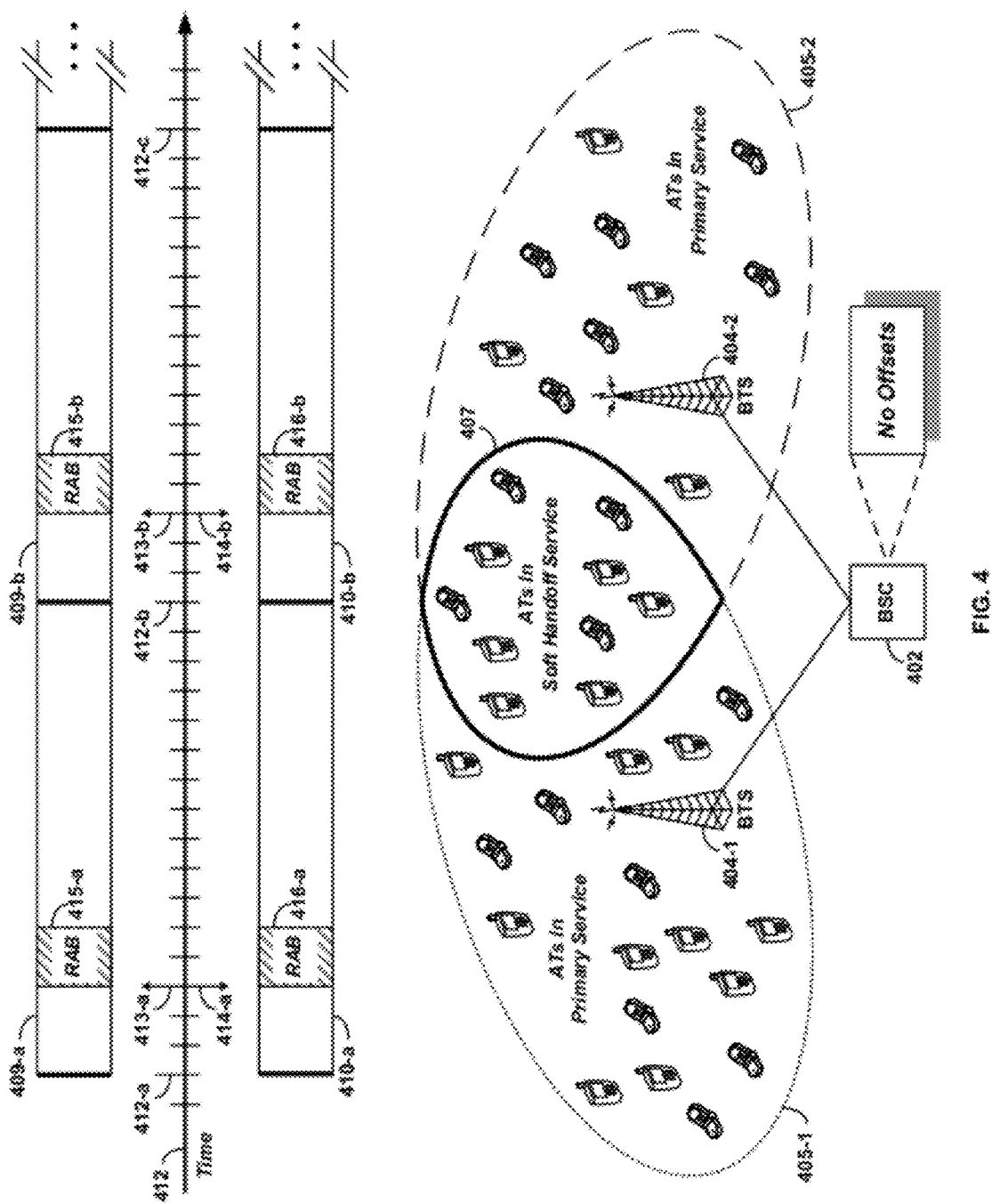
FIG. 4 illustrates conventional, simultaneous broadcast of reverse activity bits by two adjacent wireless coverage areas under the control of a common BSC, for an example distribution of access terminals among the two wireless coverage areas.

FIG. 4 illustrates conventional, simultaneous broadcast of reverse activity bits by two adjacent wireless coverage areas under the control of a common BSC, for an example distribution of access terminals among the two wireless coverage areas. The bottom portion of the figure shows a BSC 402 that controls two BTSs 404-1 and 404-2, which in turn provide two wireless coverage areas 405-1 (short-dashed oval) and 405-2 (long-dashed oval), respectively. For purposes of illustration, the two wireless coverage areas are depicted as resembling cells more than sectors, so wireless coverage areas will be take to be cells in the present discussion. However, the present discussion applies to sectors or other similar forms of wireless coverage area as well. By way of example, the cells 405-1 and 405-2 provide overlapping coverage, depicted as the region 407 (drawn in a thick black line). The term "overlapping coverage" is used here to mean that an AT in the overlapping region 407 could detect a sufficiently strong signal from each of BTS 404-1 and 404-2 to acquire service from each of them (i.e., to be able to be in soft handoff service in both cells 405-1 and 405-2).

Also by way of example, there are 27 total access terminals shown to be in service in cell 405-1, including 17 in primary service and 10 in soft handoff service in the overlap region 407. In cell 405-2 there are 20 total access terminals shown to be in service, including 10 in primary service and 10 in soft handoff service in the overlap region 407. The 10 access terminals in soft handoff in cell 405-1 are the same 10 that are in soft handoff in cell 405-2. That is, each of the 10 access terminals is in soft handoff with both of cells 405-1 and 405-2. Accordingly, each of these 10 access terminals includes both cells 405-1 and 405-2 in its active set. Note that the consideration of only two classifications of ATs—i.e., ones in primary service and ones in soft handoff service in the overlap region 407—is for purposes of illustration. The intent is to identify in each cell (1) a total number of ATs and (2) a number of ATs in common soft handoff service concurrently in both cells. In particular, there could be other ATs in soft handoff service in either of the two cells that are not in common soft handoff service in the two cells (i.e., not in overlap region 407). Such ATs would just be considered among the total number in their respective cell. However, there is no loss of generality by considering only two classifications illustrated in FIG. 4.

The top portion of FIG. 4 shows a representation of RAB broadcasts from each of cells 405-1 and 405-2 over the course of two consecutive frames 409-a, 409-b from cell 405-1, and two consecutive frames 410-a, 410-b from cell 405-2 (a third frame from each cell is shown with hatch marks and ellipses to indicate further, ongoing transmissions). A timeline 412 is displayed between the frames 409 and the frames 410; each tick mark on the timeline represents one time slot (although other time units could be used). As illustrated, the start times of frames 409-a and 410-a are synchronized at time 412-a; similarly, the start times of frames 409-b and 410-b are synchronized at time 412-*b* (and the next frame from each cell starts at time 412-*c*). A thick dark line demarks the boundary between frames.

The RAB broadcast from each cell is represented by a single hatched box labeled "RAB" in each frame. For purposes of the present illustration, each RAB is shown to last two time slots (i.e., RABlength=2), and is broadcast only once per frame. Both the duration (RABlength value) and the period could be different, but would not alter the current discussion with respect to relative RAB offsets between two or more cells (or sectors).

Since there is no relative RAB offset between the RAB broadcasts from the two cells 405-1 and 405-2, the RAB broadcasts from both cells start at the same time slot. The RAB broadcast 415-*a* from cell 405-1 begins at time 413-*a*, which by way of example corresponds to the fourth time slot of frame 409-*a*. Similarly, the RAB broadcast 416-*a* from cell 405-2 begins at time 414-*a*, which is the same as time 413-*a* and thus also corresponds to the fourth time slot of frame 410-*a*. In the next frame, the RAB broadcast 415-*b* from cell 405-1 begins at time 413-*b*, which corresponds to the fourth time slot of frame 409-*b*. And similarly, the RAB broadcast 416-*b* from cell 405-2 begins at time 414-*b*, which is the same as time 413-*b* and thus also corresponds to the fourth time slot of frame 410-*b*.

In this conventional mode of operation, the absence of a time offset between the RAB broadcasts from the two cells will cause all of the ATs in both cells to respond in near synchronicity to the respective RABs. As noted above, a possible result of such synchronous RAB broadcasts and corresponding synchronous AT responses is alternating increases and decreases of aggregate reverse-link power in one or both cells. An ancillary effect of such alternations would be alternating increases and decreases of aggregate (as well as per-AT) reverse-link data rates. The overall impact could thus be reduced efficiency and service degradation.

Figure 5:
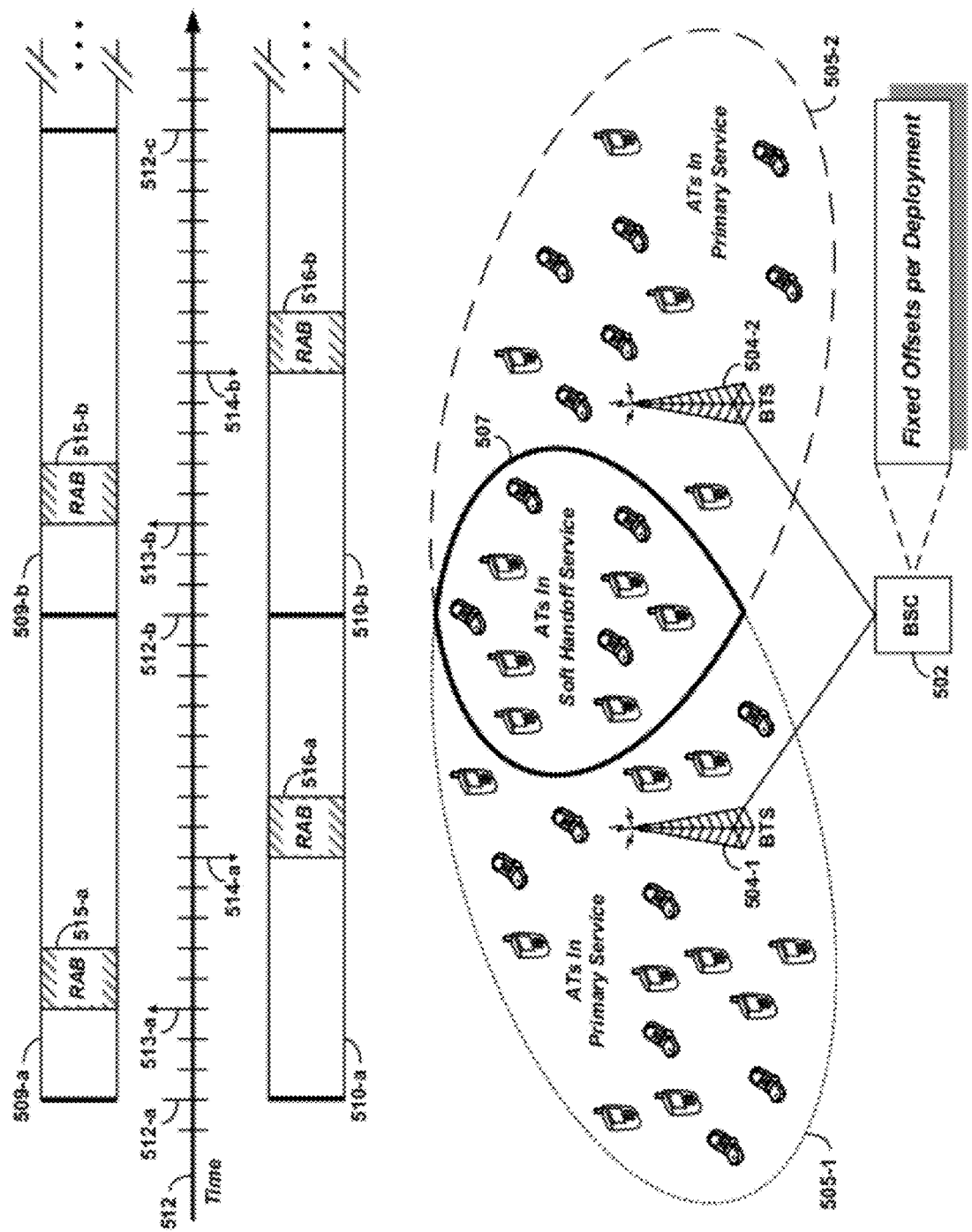
FIG. 5 illustrates conventional, time-offset broadcast of reverse activity bits by two adjacent wireless coverage areas under the control of a common BSC, for an example distribution of access terminals among the two wireless coverage areas.

In order to help mitigate the effects of synchronous RAB broadcasts of the type illustrated in FIG. 4, a RAB offset can be introduced between RAB broadcasts from neighboring cells (or sectors). The conventional way of doing this is to statically configure RAB offsets between sectors that are located next to or nearby one another. FIG. 5 illustrates this conventional approach for the same example configuration of BSC, BTSs, cells, and distribution of ATs as shown in FIG. 4. Except for beginning with a "5" instead of a "4," each item label in FIG. 5 corresponds to a like item label in FIG. 4 and identifies an identical network component or conceptual element (e.g., timeline, frame, etc.).

FIG. 5 differs from FIG. 4 in the relative time offset between RAB broadcasts from each of the cells 505-1 and 505-2. Specifically, as in FIG. 4, the respective start times 513-*a* and 513-*b* of RAB broadcasts 515-*a* and 515-*b* from cell 505-1 correspond to the fourth time slot in frames 509-*a* and 509-*b*, respectively. However, the respective start times 514-*a* and 514-*b* of RAB broadcasts 516-*a* and 516-*b* from cell 505-2 correspond to the ninth time slot in frames 510-*a* and 510-*b*, respectively. In other words, there is a relative RAB offset between RAB broadcasts from cell 505-1 and 505-2 of five time slots. The particular value of five time slots is chosen by way of example for the purposes of illustration. Other values could be used as well.

During the intervening five time slots in each frame, BTS 504-2 can evaluate the effect on RNR in cell 505-2 of the RAB broadcasts from cell 505-1. In particular, BTS 504-2 may determine that the RNR in cell 505-2 changed sufficiently during the five intervening time slots so as to warrant a change in the RAB that BTS 504-2 would have broadcast at the earlier broadcast time used by cell 505-1. If so, ping-ponging of RAB (and RNR) due to simultaneous RAB broadcasts may be avoided, or at least reduced.

However, although it is not explicitly evident from the form of the depiction in FIG. 5, the five-slot offset is statically configured. That is, RAB broadcasts from cell 505-2 always occur five time slots after RAB broadcasts from cell 505-1, at least until the statically configured offset is changed (e.g., by the network operator). In particular, this offset will be used regardless of the relative total numbers of ATs in service in cell 505-1 and in cell 505-2, or how many ATs (if any) are concurrently in soft handoff service in both cells. Consequently, the conventional approach to mitigating the effects of simultaneous RAB broadcasts can still cause adjustments to aggregate reverse-link noise that adversely impact per-AT reverse-link data rates of disproportionately large numbers of ATs.

In the example shown in FIG. 5, the impact of RAB broadcasts 515-*a* and 515-*b* is felt by 27 ATs, including the 10 in soft handoff in both cells 505-1 and 505-2. Thus, while BTS 504-2 may change its RAB values as the result of the effects of the earlier broadcasts from cell 505-1, the overall adjustment impacted 27 ATs, whereas there are only 20 ATs in cell 505-2. The static configuration of RAB offset does not allow this difference to be taken into account. Note that it could happen that the distribution of ATs at a different time could be such that the impact of the statically configured RAB offset impacts a smaller number of ATs. However, such a circumstance occurs by chance, not by design.

Figure 6:
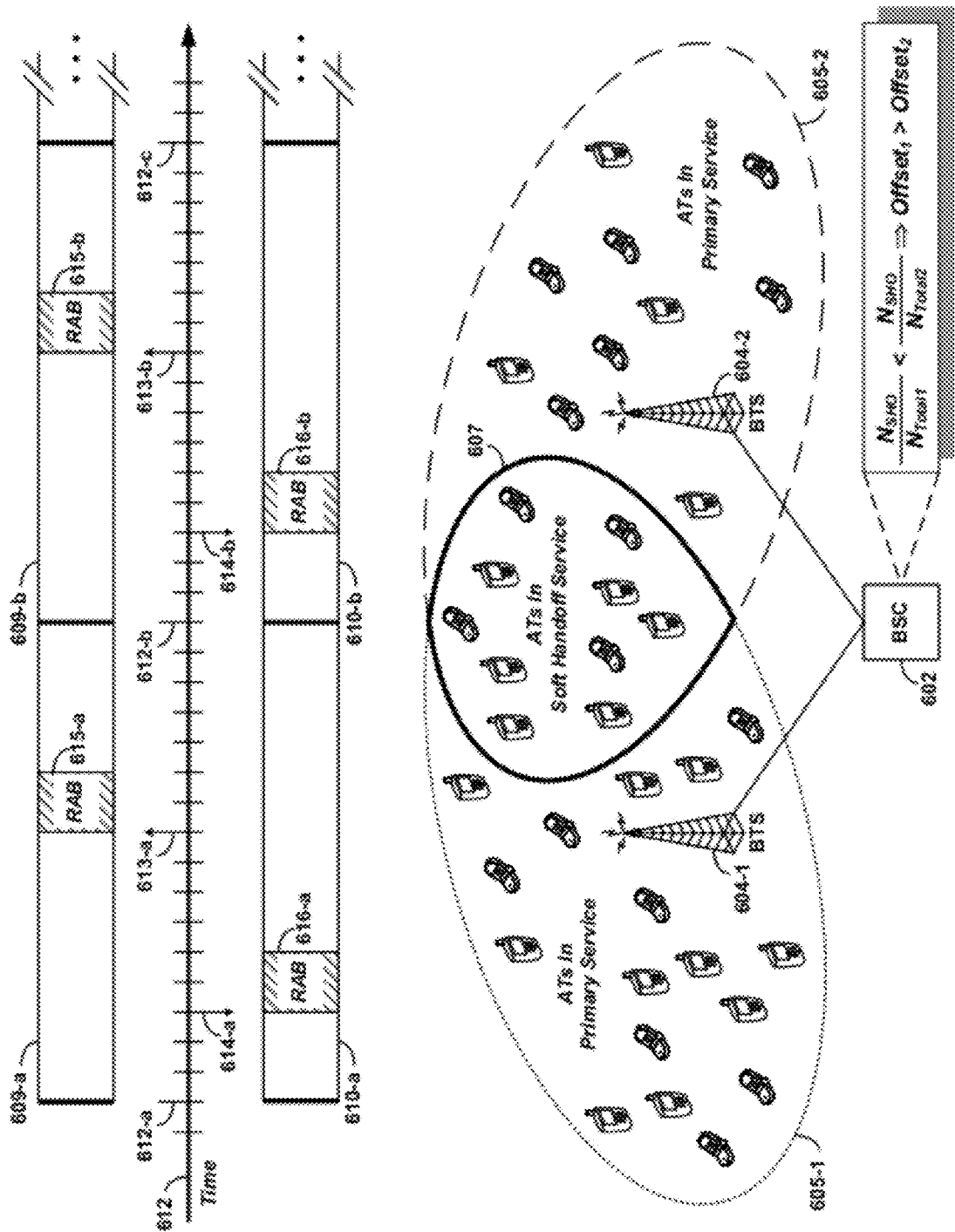
FIG. 6 illustrates broadcast of reverse activity bits by two adjacent wireless coverage areas under the control of a common BSC that employs an embodiment of dynamic reverse activity bit offset adjustment based on soft handoff ratio, for an example distribution of access terminals among the two wireless coverage areas.

FIG. 6 illustrates broadcast of reverse activity bits by two adjacent sectors under the control of a common BSC that employs an embodiment of dynamic reverse activity bit offset adjustment based on soft handoff ratio, for an example distribution of access terminals among the two sectors. This figure depicts the same example configuration of BSC, BTSs, cells, and distribution of ATs as shown in FIGS. 4 and 5. Except for beginning with a "6" instead of a "4" or "5," each item label in FIG. 6 corresponds to a like item label in FIG. 4 or 5 and identifies an identical network component or conceptual element.

In the example embodiment illustrated in FIG. 6, the relative time offset between RAB broadcasts from each of the cells 605-1 and 605-2 are now dynamically set by the BSC 602 based at least on a comparison of the numbers of ATs in each of the cells, as well as on the number of ATs in common soft handoff service in both cells. Specifically, the BSC 602 determines that there are 10 ATs in common soft handoff service in both cells 605-1 and 605-2, and that there are 27 total ATs in service in cell 605-1 and 20 in service in cell 605-2. The BSC also recognizes the condition that since there are 10 ATs in common soft handoff service in both cell, a RAB broadcast from either one of the cells will effect the RNR in both cells. Because there is a larger total number of ATs in cell 605-1, the BSC dynamically sets the RAB offset of cell 605-1 to a larger value than the RAB offset of cell 605-2, where each RAB offset is measured from the start of a frame. In doing so, the BSC introduces a positive, relative RAB offset of RAB broadcast time of cell 605-1 with respect to RAB broadcast time of cell 605-2.

By way of example in FIG. 6, the respective start times 614-*a* and 614-*b* of RAB broadcasts 616-*a* and 616-*b* from cell 605-2 (with the smaller total number of ATs) correspond to the fourth time slot in frames 610-*a* and 610-*b*, respectively. However, the respective start times 613-*a* and 613-*b* of RAB broadcasts 615-*a* and 615-*b* from cell 605-1 (with the larger total number of ATs) now correspond to the tenth time slot in frames 609-*a* and 609-*b*, respectively. In other words, there is a relative RAB offset between RAB broadcasts from cell 605-2 and 605-1 of six time slots. The particular value of six time slots is chosen arbitrarily for the moment by way of example for the purposes of illustration. A more specific approach to dynamically determining RAB offset is described below.

During the intervening six time slots in each frame, BTS 604-1 can evaluate the effect on RNR in cell 605-1 of the RAB broadcasts from cell 605-2. In particular, BTS 604-1 may determine that the RNR in cell 605-1 changed sufficiently during the six intervening time slots so as to warrant a change in the RAB that BTS 604-1 would have broadcast at the earlier broadcast time used by cell 605-2. If so, ping-ponging of RAB (and RNR) due to simultaneous RAB broadcasts may be avoided, or at least reduced.

The impact of RAB broadcasts 616-$a$ and 616-$b$ is felt by 20 ATs, including the 10 in soft handoff in both cells 605-1 and 605-2. Thus, if BTS 604-1 can change its RAB values as the result of the effects of the earlier broadcasts from cell 605-2, the overall adjustment will have impacted only 20 ATs, whereas it would have impacted 27 ATs in cell 605-1 had that cell broadcast first. Unlike the conventional approach to RAB offset, the cell will impact the smallest total number of ATs will broadcast earlier by design. Advantageously, this ensures that the number of ATs impacted is as small as possible, while still retaining the ability to adequately adjust RNR in a cell with a larger total number of ATs.

In accordance more specific operation of the example embodiment, the BSC will determine the specific value of RAB offset between two cells (or sectors) based on the ratio soft handoff ATs to total ATs in each respective cell. For the present example, the BSC 602 will calculate these ratios as $R_{605-1}=10/27$ and $R_{605-2}=10/20$. The BSC will then compare a metric of each ratio to determine how to adjust the RAB offset of each cell. In the simplest case, the metric of each ratio is just the ratio itself. Accordingly, the BSC will determine that the larger ratio corresponds to the smaller total number of ATs, and vice versa. This is because the numerator of each ratio is the same number, namely the number of ATs in common soft handoff in both cells. Hence, the cell with the smaller ratio will get a larger RAB offset, and vice versa.

In accordance with the example embodiment, the specific value of the relative RAB offset will be selected by the BSC based on the difference in the relative total numbers of ATs in the two sectors. More specifically, the larger the difference in the relative total numbers, the large the RAB offset. In further accordance with the example embodiment, the BSC will maintain in it memory (e.g., disk, solid state, etc.) a table of RAB offset values correlated with ranges of a ratio comparing total numbers of ATs in two sectors under consideration. FIG. 7 illustrates an example RAB offset Table 700. The table defines a ratio R of the larger total number to the smaller total number, wherein the term "total number" is an abbreviation for "total number of ATs in service in the wireless coverage area." The larger and smaller total numbers are designated in the table as N_total$_{Larger}$ and N_total$_{Smaller}$, respectively; whereby R=N_total$_{Larger}$/N_total$_{Smaller}$.

By way of example, the Table 700 includes six ranges of the ratio R, each with an associated RAB offset value (in units of time slots). For example, for R in the range $1<R\leq2$, the RAB offset would be set to one; for R in the range $2<R\leq3$, the RAB offset would be set to two; and so on. Note that in the example illustrated in FIG. 6, $R_{605-1}=10/27$ and $R_{605-2}=10/20$, so that R=1.35, corresponding to a RAB offset value of one, not the value of six used in the discussion. The RAB offset value of six was used in the discussion of FIG. 6 strictly to facilitate the explanation, and discrepancy with the value specified in the table should not be viewed as significant.

In operation, the BSC will continually monitor the numbers of ATs in service in each sector under its control, as well as the numbers in soft handoff in each sector. The BSC will then determine for if the number of ATs in soft handoff in two given sectors is above a threshold number. If not, the BSC will not dynamically adjust the relative RAB offsets of the two given sectors. However, if the threshold is exceeded, then the BSC will use Table 700 (or a similar data structure with similar data) to determine the relative RAB offset. Once determined, the BSC will instruct each sector to use a respective RAB offset such that there is the relative RAB offset between them. When each sector dynamically adjusts its RAB offset based on the instruction from the BSC, each will also broadcast a message informing all ATs of the new RAB offset. It will be appreciated that there are numerous, various messages available in communications between a BSC (or RNC) at the sectors under its control that could be used for the purposed described herein. Additionally, new messages could be devised if necessary.

4. Implementation of Example Embodiments

The example embodiment of dynamic reverse activity bit offset adjustment based on soft handoff ratio described above can be implemented as a method in a base station (e.g., BSC, RNC, etc.) that is part of a wireless communication system that operates according to a CDMA family of protocols, such as the one described above in connection with FIG. 2. The next subsection provides logical steps and operations of the method of an example embodiment of dynamic reverse activity bit offset adjustment based on soft handoff ratio. Example means for carrying out the method in a BSC, RNC, or the like are described in the subsequent subsection.

a. Example Method

Figure 8:
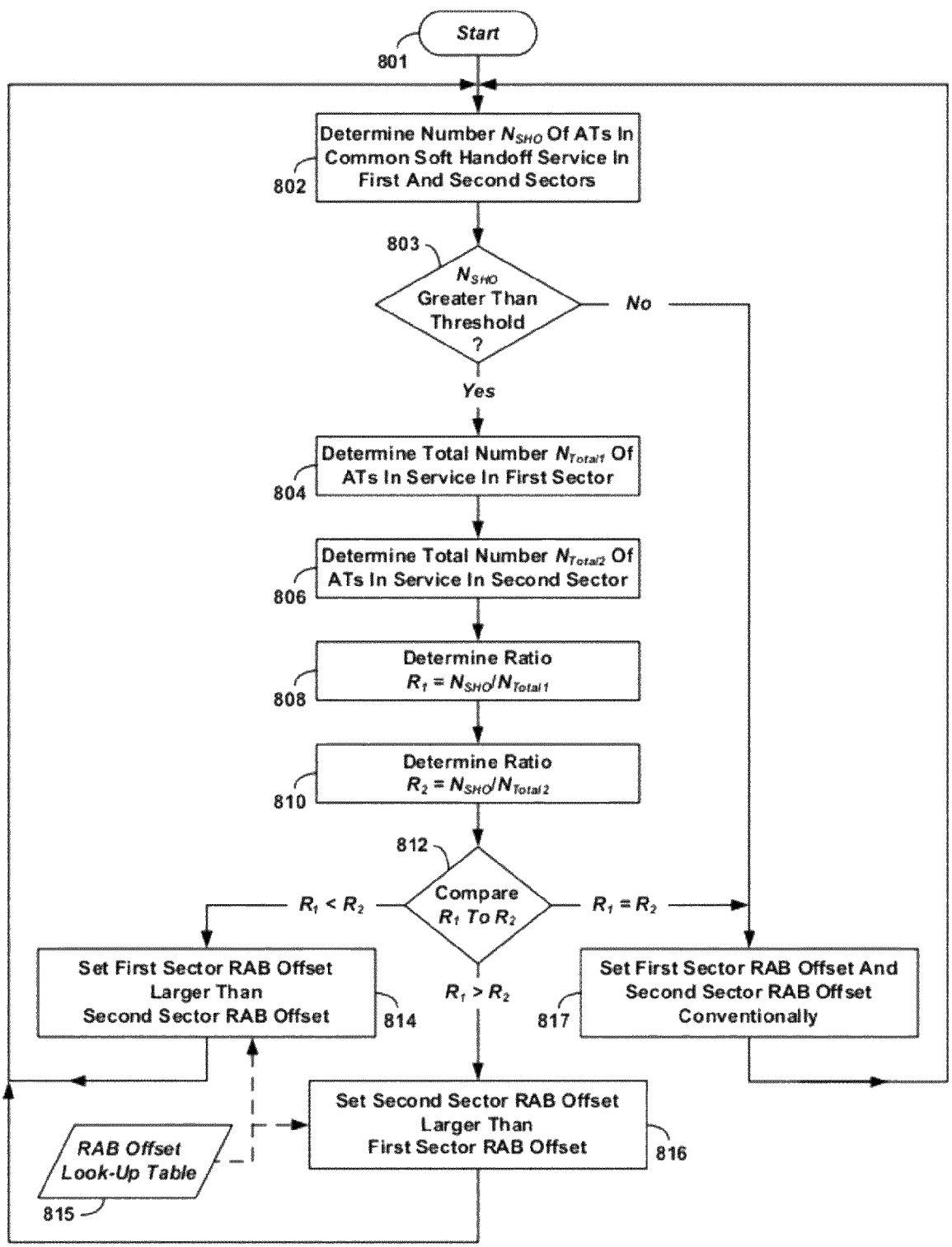
FIG. 8 illustrates an example embodiment of logical steps for implementing in a base station a method of dynamic reverse activity bit offset adjustment based on soft handoff ratio.

FIG. 8 depicts an example method carried out by a base station of the example embodiment of dynamic reverse activity bit offset adjustment based on soft handoff ratio in the form of a logical flowchart. The steps could be implemented as software, firmware, and/or hardware instructions stored in physical memory of a BSC, RNC, or the like, and executed by one or more general purpose and/or special purpose processors.

At the start 801 the BSC is controlling a plurality of sectors, including at least a first sector and a second sector. Each sector is serving access terminals in active EVDO sessions. At step 802, the BSC determines a number $N_{SHO}$ of access terminals that are in common soft handoff in both the first and second sectors.

At step 803, the BSC determines whether $N_{SHO}$ is greater than a threshold number. By way of example, the threshold number could be 10, but other values could be used as well. If $N_{SHO}$ does not exceed the threshold ("No" branch from step 803), then the BSC proceeds to step 817, where the RAB offsets for the first and second sectors are set conventionally. For instance, static offsets could be used. The process then returns to step 802 and repeats.

If at step 803 the BSC determines that $N_{SHO}$ does exceed the threshold ("Yest" branch from step 803), then the BSC proceeds to steps 804 and 806, wherein the BSC determines the total number $N_{Total1}$ of ATs in service in the first sector and the total number $N_{Total2}$ of ATs in service in the second sector, respectively.

At steps 808 and 810, the BSC next determines the "soft handoff ratio" in each sector. Namely, in first sector (step 808)

the soft handoff ratio is $R_1=N_{SHO}/N_{Total1}$ and in second (step 810) sector the soft handoff ratio is $R_2=N_{SHO}/N_{Total2}$.

Next, at step 812 the BSC compares $R_1$ and $R_2$. If $R_1<R_2$ (branch labeled "$R_1<R_2$" from step 812), the BSC proceeds to step 814, wherein the RAB offset of the first sector is set larger than the RAB offset of the second sector. In making this adjustment in RAB offset, the BSC consults the RAB Offset Look-Up Table 815. The dashed arrow from Table 815 to step 814 represents the consultation. This table could be implemented in the form of the RAB Offset Table 700 discussed in connection with FIG. 7 above. The process then returns to step 802 and repeats.

If $R_1>R_2$ (branch labeled "$R_1>R_2$" from step 812), the BSC proceeds to step 816, wherein the RAB offset of the second sector is set larger than the RAB offset of the first sector. Again, the BSC consults the RAB Offset Look-Up Table 815 to make this adjustment to RAB offset, and the dashed arrow from Table 815 to step 816 represents the consultation. The process then returns to step 802 and repeats.

If $R_1=R_2$ (branch labeled "$R_1=R_2$" from step 812), the BSC proceeds to step 817, where, again, the RAB offsets for the first and second sectors are set conventionally. The process then returns to step 802 and repeats.

It will be appreciated that the steps shown in FIG. 8 are meant to illustrate operation of an example embodiment of dynamic reverse activity bit offset adjustment based on soft handoff ratio. As such, various steps could be altered or modified, and the ordering of certain steps could be changed, while still achieving the overall desired operation.

b. Example Base Station

Figure 9:
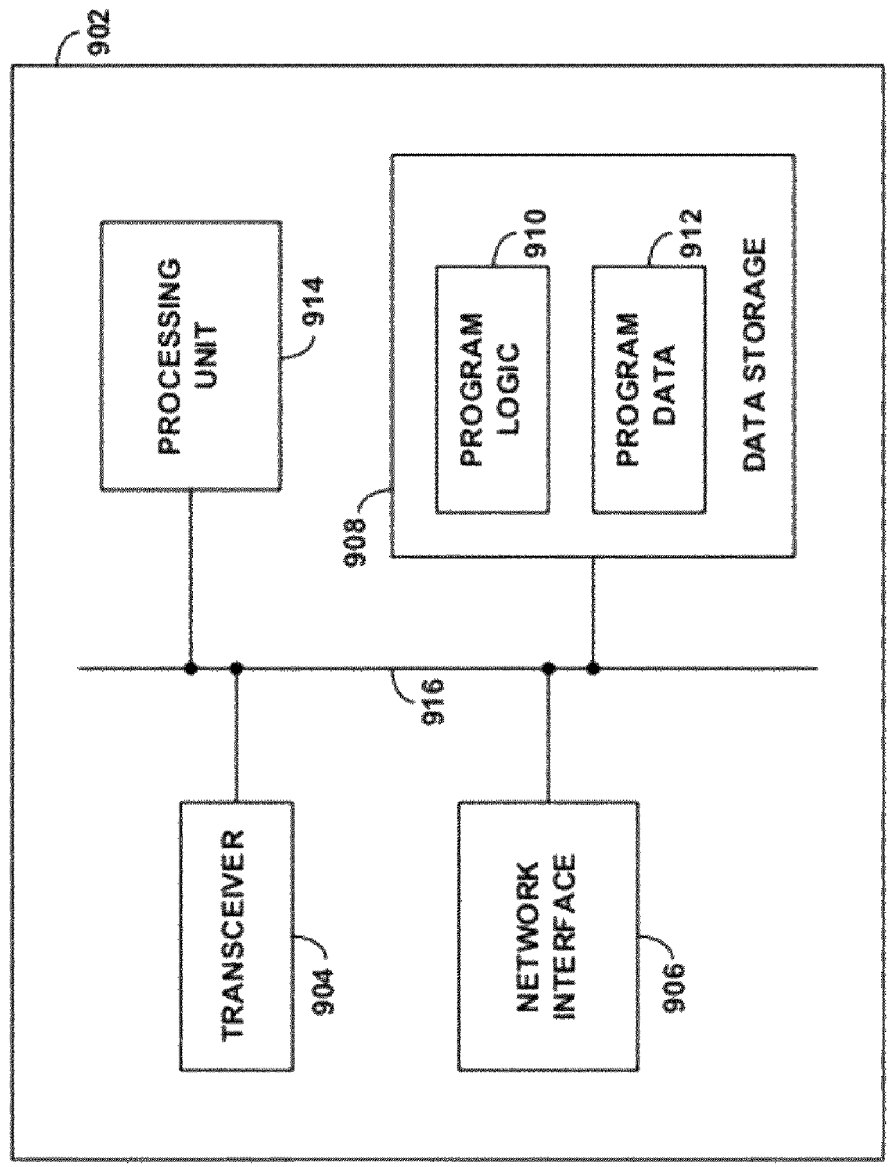
FIG. 9 is a block diagram of an example base station in which dynamic reverse activity bit offset adjustment based on soft handoff ratio may be implemented.

FIG. 9 is a simplified block diagram depicting functional components of an example a control device 902 (e.g., a BSC, RNC, or the like) in which dynamic reverse activity bit offset adjustment based on soft handoff ratio may be implemented according, for example, to the example method described above. As shown in FIG. 9, the example control device 902, representative of BSC 206 in FIG. 2, for instance, includes a transceiver 904, network interface 906, a processing unit 914, and data storage 908, all of which may be coupled together by a system bus 916 or other mechanism. In addition, the control device may also include external storage, such as magnetic or optical disk storage, although this is not shown in FIG. 9.

These components may be arranged to support conventional operation in a wireless communication network that is compliant with a CDMA family of protocols, such as network 200 illustrated in FIG. 2. The details of such an arrangement and how these components function to provide conventional operation are well-known in the art, and are not described further herein. Certain aspects of control device 902 relevant to dynamic reverse activity bit offset adjustment based on soft handoff ratio are discussed briefly below.

Network interface 906 enables communication on a network, such network 200. As such, network interface 906 may take the form of trunk or optical link that can be coupled with a TDM switch such as MSC 208, or an Ethernet network interface card or other physical connection that can be coupled with PCF 214, for instance. Further, network interface 906 in combination with transceiver 904, which may control or manage one or more BTS antennas, enables air interface communication one or more access terminals, supporting reception of data frames on the ATs' reverse links and user traffic and control on the ATs' forward links.

Processing unit 914 comprises one or more general-purpose processors (e.g., INTEL microprocessors) and/or one or more special-purpose processors (e.g., dedicated digital signal processor, application specific integrated circuit, etc.). In turn, the data storage 908 comprises one or more volatile and/or non-volatile storage components, such as magnetic or optical memory or disk storage. Data storage 908 can be integrated in whole or in part with processing unit 914, as cache memory or registers for instance. As further shown, data storage 908 is equipped to hold program logic 910 and program data 912.

Program logic 910 may comprise machine language instructions that define routines executable by processing unit 914 to carry out various functions described herein. In particular the program logic, communication interface, and transceiver may operate cooperatively to carry out logical operation such as that discussed above and illustrated in FIG. 8. Further, program data 912 may be arranged to store a RAB Offset Look-Up Table, such as the example table discussed in conjunction with the logical operations described above.

It will be appreciated that there can be numerous specific implementations of dynamic reverse activity bit offset adjustment based on soft handoff ratio, such control device 902 illustrated in FIG. 9. Further, one of skill in the art would understand how to devise and build such an implementation. As such, control device 902 is representative of means for carrying out the methods of dynamic reverse activity bit offset adjustment based on soft handoff ratio in accordance with the functions and steps described herein by way of example.

5. CONCLUSION

An example embodiment of the present invention has been described above. Those skilled in the art will understand, however, that changes and modifications may be made to this embodiment without departing from the true scope and spirit of the invention, which is defined by the claims.

I claim:

1. In a device configured to control a plurality of wireless coverage areas of a wireless communication system, the plurality including at least a first wireless coverage area and a second wireless coverage area, a method comprising:

at the device, determining a first ratio of a first number of first access terminals in soft handoff service within the first wireless coverage area to a first total number of access terminals in service within the first coverage area;

at the device, determining a second ratio of a second number of second access terminals in soft handoff service within the second wireless coverage area to a second total number access terminals in service within the second coverage area; and at the device, based at least on a comparison of the first and second ratios, dynamically setting a relative time difference between a first transmission of a first noise-indication message from the first wireless coverage area and a second transmission of a second noise-indication message from the second wireless coverage area, whereby the first wireless coverage area will be caused to transmit the first noise-indication message at a first transmission time and the second wireless coverage area will be caused to transmit the second noise-indication message at a second transmission time, such that the first and second transmission times will be separated by the relative time difference.

2. The method of claim 1, wherein dynamically setting the relative time difference between the first transmission and the second transmission comprises:

setting a first relative time offset between the first transmission time and a reference time, the first relative time offset being measured positively from the reference time to the first transmission time; and setting a second relative time offset between the second transmission and the reference time, the second relative time offset being measured positively from the reference time to the second transmission time.

3. The method of claim 2, wherein setting the first relative time offset comprises setting the first relative time offset to a larger value than the second relative time offset if the first ratio smaller than the second ratio, and setting the first relative time offset to a smaller value than the second relative time offset if the first ratio larger than the second ratio, and wherein setting the second relative time offset comprises setting the second relative time offset to a larger value than the first relative time offset if the second ratio smaller than the first ratio, and setting the second relative time offset to a smaller value than the first relative time offset if the second ratio larger than the first ratio.

4. The method of claim 2, wherein the device is further configured to operate according to a CDMA family of protocols, including at least IS-856, Rel. 0, wherein the device is one of base station controller or a radio node controller, and each wireless coverage area of the plurality is a cell or a sector, wherein the first noise-indication message comprises a first Reverse Activity Bit (RAB) value, and the second noise-indication message comprises a second RAB value, wherein the reference time comprises a synchronous, periodic start time of frame transmissions on respective forward links of each of the plurality of wireless coverage areas, wherein setting the first relative time offset comprises dynamically setting a first RAB offset relative to the start time, and wherein setting the second relative time offset comprises dynamically setting a second RAB offset relative to the start time.

5. The method of claim 2, further comprising:
causing the first wireless coverage are to transmit a first update message including an indication of the first relative time offset to all access terminals being served by the first wireless coverage area; and
causing the second wireless coverage are to transmit a second update message including an indication of the second relative time offset to all access terminals being served by the second wireless coverage area.

6. The method of claim 1, wherein the first access terminals in soft handoff service within the first wireless coverage area and the second access terminals in soft handoff service within the second wireless coverage are the same access terminals, wherein the first number is equal to the second number,
wherein the first total number of access terminals in service within the first coverage area comprises the first number of first access terminals in soft handoff service within the first wireless coverage area and a number of access terminals in primary service within the first coverage area,
and wherein the second total number of access terminals in service within the second coverage area comprises the second number of second access terminals in soft handoff service within the second wireless coverage area and a number of access terminals in primary service within the second coverage area.

7. The method of claim 1, wherein dynamically setting the relative time difference based at least on the comparison of the first and second ratios comprises dynamically setting the relative time difference based also on a determination that each of the first number and the second number exceeds a threshold number.

8. The method of claim 1, wherein the plurality of wireless coverage areas includes a third wireless coverage area,
and wherein the method further comprises:
determining a a third ratio of a third number of third access terminals in soft handoff service within the third wireless coverage area to a third total number access terminals in service within the third coverage area; and
based on a comparison of the first, second, and third ratios, dynamically setting an additional relative time difference between a third transmission of a third noise-indication message from the third wireless coverage area and a transmission selected from the first transmission and the second transmission.

9. A device configured to control a plurality of wireless coverage areas of a wireless communication system, wherein the plurality includes at least a first wireless coverage area and a second wireless coverage area, the device comprising:
means for determining a first ratio of a first number of first access terminals in soft handoff service within the first wireless coverage area to a first total number of access terminals in service within the first coverage area;
means for determining a second ratio of a second number of second access terminals in soft handoff service within the second wireless coverage area to a second total number access terminals in service within the second coverage area; and
means for, based at least on a comparison of the first and second ratios, dynamically setting a relative time difference between a first transmission of a first noise-indication message from the first wireless coverage area and a second transmission of a second noise-indication message from the second wireless coverage area,
whereby the first wireless coverage area will be caused to transmit the first noise-indication message at a first transmission time and the second wireless coverage area will be caused to transmit the second noise-indication message at a second transmission time, such that the first and second transmission times will be separated by the relative time difference.

10. The device of claim 9, wherein dynamically setting the relative time difference between the first transmission and the second transmission comprises:
setting a first relative time offset between the first transmission time and a reference time, wherein the first relative time offset is measured positively from the reference time to the first transmission time; and
setting a second relative time offset between the second transmission and the reference time, wherein the second relative time offset is measured positively from the reference time to the second transmission time.

11. The device of claim 10, wherein setting the first relative time offset comprises setting the first relative time offset to a larger value than the second relative time offset if the first ratio smaller than the second ratio, and setting the first relative time offset to a smaller value than the second relative time offset if the first ratio larger than the second ratio,
and wherein setting the second relative time offset comprises setting the second relative time offset to a larger value than the first relative time offset if the second ratio smaller than the first ratio, and setting the second relative time offset to a smaller value than the first relative time offset if the second ratio larger than the first ratio.

12. The device of claim 10, wherein the device is further configured to operate according to a CDMA family of protocols, including at least IS-856, Rel. 0, wherein the device is one of base station controller or a radio node controller, and each wireless coverage area of the plurality is a cell or a sector, wherein the first noise-indication message comprises a first Reverse Activity Bit (RAB) value, and the second noise-indication message comprises a second RAB value, wherein the reference time comprises a synchronous, periodic start time of frame transmissions on respective forward links of each of the plurality of wireless coverage areas, wherein setting the first relative time offset comprises dynamically setting a first RAB offset relative to the start time, and wherein setting the second relative time offset comprises dynamically setting a second RAB offset relative to the start time.

13. The device of claim 10, further comprising:

means for causing the first wireless coverage are to transmit a first update message including an indication of the first relative time offset to all access terminals being served by the first wireless coverage area; and means for causing the second wireless coverage are to transmit a second update message including an indication of the second relative time offset to all access terminals being served by the second wireless coverage area.

14. The device of claim 9, wherein the first access terminals in soft handoff service within the first wireless coverage area and the second access terminals in soft handoff service within the second wireless coverage are the same access terminals, wherein the first number is equal to the second number, wherein the first total number of access terminals in service within the first coverage area comprises the first number of first access terminals in soft handoff service within the first wireless coverage area and a number of access terminals in primary service within the first coverage area, and wherein the second total number of access terminals in service within the second coverage area comprises the second number of second access terminals in soft handoff service within the second wireless coverage area and a number of access terminals in primary service within the second coverage area.

15. The device of claim 9, wherein dynamically setting the relative time difference based at least on the comparison of the first and second metrics ratios comprises dynamically setting the relative time difference based also on a determination that each of the first number and the second number exceeds a threshold number.

16. The device of claim 9, wherein the plurality of wireless coverage areas includes a third wireless coverage area, and wherein the device further comprises:

means for determining a third ratio of a third number of third access terminals in soft handoff service within the third wireless coverage area to a third total number access terminals in service within the third coverage area; and means for, based on a comparison of the first, second, and third ratios, dynamically setting an additional relative time difference between a third transmission of a third noise-indication message from the third wireless coverage area and a transmission selected from the first transmission and the second transmission.

17. A tangible computer-readable medium having stored thereon computer-executable instructions that, if executed by a processor of a device configured to control a plurality of wireless coverage areas of a wireless communication system, wherein the plurality includes at least a first wireless coverage area and a second wireless coverage area, cause the device to perform functions comprising:

determining a first ratio of a first number of first access terminals in soft handoff service within the first wireless coverage area to a first total number of access terminals in service within the first coverage area;

determining a second ratio of a second number of second access terminals in soft handoff service within the second wireless coverage area to a second total number access terminals in service within the second coverage area; and based at least on a comparison of the first and second ratios, dynamically setting a relative time difference between a first transmission of a first noise-indication message from the first wireless coverage area and a second transmission of a second noise-indication message from the second wireless coverage area, whereby the first wireless coverage area will be caused to transmit the first noise-indication message at a first transmission time and the second wireless coverage area will be caused to transmit the second noise-indication message at a second transmission time, such that the first and second transmission times will be separated by the relative time difference.

18. The tangible computer-readable medium of claim 17, wherein dynamically setting the relative time difference between the first transmission and the second transmission comprises:

setting a first relative time offset between the first transmission time and a reference time, wherein the first relative time offset is measured positively from the reference time to the first transmission time; and setting a second relative time offset between the second transmission and the reference time, wherein the second relative time offset is measured positively from the reference time to the second transmission time.

19. The tangible computer-readable medium of claim 18, wherein setting the first relative time offset comprises setting the first relative time offset to a larger value than the second relative time offset if the first ratio smaller than the second ratio, and setting the first relative time offset to a smaller value than the second relative time offset if the first ratio larger than the second ratio, and wherein setting the second relative time offset comprises setting the second relative time offset to a larger value than the first relative time offset if the second ratio smaller than the first ratio, and setting the second relative time offset to a smaller value than the first relative time offset if the second ratio larger than the first ratio.

20. The tangible computer-readable medium of claim 18, wherein the device is further configured to operate according to a CDMA family of protocols, including at least IS-856, Rel. 0, wherein the device is one of base station controller or a radio node controller, and each wireless coverage area of the plurality is a cell or a sector, wherein the first noise-indication message comprises a first Reverse Activity Bit (RAB) value, and the second noise-indication message comprises a second RAB value, wherein the reference time comprises a synchronous, periodic start time of frame transmissions on respective forward links of each of the plurality of wireless coverage areas, wherein setting the first relative time offset comprises dynamically setting a first RAB offset relative to the start time, and wherein setting the second relative time offset comprises dynamically setting a second RAB offset relative to the start time.

21. The tangible computer-readable medium of claim 18, wherein the functions further comprise:
   causing the first wireless coverage are to transmit a first update message including an indication of the first relative time offset to all access terminals being served by the first wireless coverage area; and
   causing the second wireless coverage are to transmit a second update message including an indication of the second relative time offset to all access terminals being served by the second wireless coverage area.

22. The tangible computer-readable medium of claim 17, wherein the first access terminals in soft handoff service within the first wireless coverage area and the second access terminals in soft handoff service within the second wireless coverage are the same access terminals,
   wherein the first number is equal to the second number,
   wherein the first total number of access terminals in service within the first coverage area comprises the first number of first access terminals in soft handoff service within the first wireless coverage area and a number of access terminals in primary service within the first coverage area,
   and wherein the second total number of access terminals in service within the second coverage area comprises the second number of second access terminals in soft handoff service within the second wireless coverage area and a number of access terminals in primary service within the second coverage area.

23. The tangible computer-readable medium of claim 17, wherein dynamically setting the relative time difference based at least on the comparison of the first and second ratios comprises dynamically setting the relative time difference based also on a determination that each of the first number and the second number exceeds a threshold number.

24. The tangible computer-readable medium of claim 17, wherein the plurality of wireless coverage areas includes a third wireless coverage area,
   and wherein the functions further comprise:
   determining a third ratio of a third number of third access terminals in soft handoff service within the third wireless coverage area to a third total number access terminals in service within the third coverage area; and
   based on a comparison of the first, second, and third ratios, dynamically setting an additional relative time difference between a third transmission of a third noise-indication message from the third wireless coverage area and a transmission selected from the first transmission and the second transmission.

* * * * *